United States Patent
Ito et al.

(10) Patent No.: US 10,131,767 B2
(45) Date of Patent: Nov. 20, 2018

(54) POLYMERIZABLE COMPOSITION FOR OPTICAL MATERIAL, OPTICAL MATERIAL OBTAINED FROM POLYMERIZABLE COMPOSITION, AND MANUFACTURING METHOD OF OPTICAL MATERIAL

(71) Applicant: Mitsui Chemicals, Inc., Minato-ku, Tokyo (JP)

(72) Inventors: Shinsuke Ito, Omuta (JP); Nobuo Kawato, Kurume (JP); Kouji Suesugi, Arao (JP); Shigetoshi Kuma, Kurume (JP); Tatsuya Ogawa, Ravenna (IT); Toshiya Hashimoto, Ichihara (JP); Mamoru Tanaka, Fukuoka (JP)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 385 days.

(21) Appl. No.: 14/777,783

(22) PCT Filed: Mar. 26, 2014

(86) PCT No.: PCT/JP2014/058671
§ 371 (c)(1),
(2) Date: Sep. 17, 2015

(87) PCT Pub. No.: WO2014/157407
PCT Pub. Date: Oct. 2, 2014

(65) Prior Publication Data
US 2016/0272784 A1    Sep. 22, 2016

(30) Foreign Application Priority Data

Mar. 26, 2013  (JP) .................................. 2013-063478
Jun. 10, 2013  (JP) .................................. 2013-121627

(Continued)

(51) Int. Cl.
C08K 5/3435    (2006.01)
G02B 1/04      (2006.01)
(Continued)

(52) U.S. Cl.
CPC ...... *C08K 5/3435* (2013.01); *B29D 11/00009* (2013.01); *C08G 18/48* (2013.01);
(Continued)

(58) Field of Classification Search
CPC ...... C08K 5/3435; C08K 5/3475; C08K 5/13; C08G 18/48; C08G 18/7621; G02B 1/04; G02B 1/041; B29D 11/00009
See application file for complete search history.

(56) References Cited

U.S. PATENT DOCUMENTS 5,594,088 A    1/1997   Nagata et al.
5,753,730 A    5/1998   Nagata et al.
(Continued)

FOREIGN PATENT DOCUMENTS

CN    1317515 A     10/2001
CN    102186897 A   9/2011
(Continued)

OTHER PUBLICATIONS

Office Action dated Dec. 30, 2016, by the Chinese Patent Office in corresponding Chinese Patent Application No. 201480012069.4 (13 pages).
(Continued)

*Primary Examiner* — Mathieu D Vargot
(74) *Attorney, Agent, or Firm* — Buchanan, Ingersoll & Rooney PC

(57) ABSTRACT

The polymerizable composition for an optical material of the present invention contains (A) at least one kind of isocyanate having two or more isocyanato groups, which contains aromatic isocyanate, (B) at least one kind of alcohol having
(Continued)

two or more hydroxyl groups, (C) an acidic phosphoric acid ester represented by the following Formula (1), and (D) a benzotriazole-based compound, in which a ratio of secondary hydroxyl groups to the total molar number of primary and secondary hydroxyl groups contained in the alcohol (B) is equal to or greater than 50%, and the benzotriazole-based compound (D) is contained in an amount of 1 part by weight to 11 parts by weight with respect to a total of 100 parts by weight of the isocyanate (A) and the alcohol (B).

27 Claims, 2 Drawing Sheets

(30) Foreign Application Priority Data

Nov. 1, 2013 (JP) ...................... PCT/JP2013/079790
Nov. 1, 2013 (JP) ...................... PCT/JP2013/079791

(51) Int. Cl.

| | | |
|---|---|---|
| *B29D 11/00* | (2006.01) | |
| *C08K 5/3475* | (2006.01) | |
| *C08G 18/48* | (2006.01) | |
| *C08G 18/76* | (2006.01) | |
| *C08K 5/13* | (2006.01) | |
| *C08K 5/521* | (2006.01) | |
| *C08K 5/053* | (2006.01) | |
| *C08K 5/29* | (2006.01) | |
| *B29K 75/00* | (2006.01) | |

(52) U.S. Cl.
CPC ............ *C08G 18/7621* (2013.01); *C08K 5/13* (2013.01); *C08K 5/3475* (2013.01); *G02B 1/04* (2013.01); *G02B 1/041* (2013.01); *B29K 2075/00* (2013.01); *B29K 2995/0034* (2013.01); *C08K 5/053* (2013.01); *C08K 5/29* (2013.01); *C08K 5/521* (2013.01)

(56) References Cited

U.S. PATENT DOCUMENTS

| | | | |
|---|---|---|---|
| 5,962,561 A | 10/1999 | Turshani et al. | |
| 6,187,844 B1 | 2/2001 | Murata | |
| 7,967,434 B2 | 6/2011 | Miura et al. | |
| 8,063,167 B2 | 11/2011 | Kajita et al. | |
| 8,496,859 B2 | 7/2013 | Miura et al. | |
| 8,829,147 B2 | 9/2014 | Bos et al. | |
| 2002/0022713 A1 | 2/2002 | Tanaka et al. | |
| 2003/0149230 A1 | 8/2003 | Tanaka et al. | |
| 2003/0199668 A1 | 10/2003 | Tanaka et al. | |
| 2008/0036964 A1 | 2/2008 | Miura et al. | |
| 2010/0056746 A1 | 3/2010 | Kajita et al. | |
| 2011/0034660 A1 | 2/2011 | Ryu et al. | |
| 2011/0215493 A1 | 9/2011 | Miura et al. | |
| 2011/0251301 A1 | 10/2011 | Bos et al. | |
| 2012/0114953 A1 | 5/2012 | Ogawa et al. | |

FOREIGN PATENT DOCUMENTS

| | | |
|---|---|---|
| CN | 102227456 A | 10/2011 |
| CN | 102471426 A | 5/2012 |
| JP | 60-194401 A | 10/1985 |
| JP | 1-302202 A | 12/1989 |
| JP | 3-287641 A | 12/1991 |
| JP | H06-136086 A | 5/1994 |
| JP | 8-208794 A | 8/1996 |
| JP | 11-231102 A | 8/1999 |
| JP | 2008-56854 A | 3/2008 |
| JP | 2008-144154 A | 6/2008 |
| JP | 2009-520057 A | 5/2009 |
| JP | 2011-12141 A | 1/2011 |
| JP | 2012-181268 A | 9/2012 |
| JP | 2012-521478 A | 9/2012 |
| KR | 10-2012-0047865 A | 5/2012 |
| WO | WO 2007/078549 A2 | 7/2007 |
| WO | WO 2008/018168 A1 | 2/2008 |
| WO | WO 2008/092597 A2 | 8/2008 |
| WO | WO 2010/043392 A1 | 4/2010 |
| WO | WO 2010/110784 A1 | 9/2010 |
| WO | WO 2011/016229 A1 | 2/2011 |
| WO | WO 2014/080749 A1 | 5/2014 |
| WO | WO 2014/080750 A1 | 5/2014 |

OTHER PUBLICATIONS

Office Action dated Dec. 12, 2016, by the Korean Patent Office in corresponding Korean Patent Application No. 10-2015-7024153 (7 pages).

Extended Search Report dated Sep. 1, 2016, by the European Patent Office in corresponding European Patent Application No. 14775376.8 (7 pages).

International Search Report (PCT/ISA/210) dated Jun. 24, 2014, by the Japanese Patent Office as the International Searching Authority for International Application No. PCT/JP2014/058671.

POLYMERIZABLE COMPOSITION FOR OPTICAL MATERIAL, OPTICAL MATERIAL OBTAINED FROM POLYMERIZABLE COMPOSITION, AND MANUFACTURING METHOD OF OPTICAL MATERIAL

TECHNICAL FIELD

The present invention relates to a polymerizable composition for an optical material that provides a urethane-molded product, an optical material obtained from the polymerizable composition, and a manufacturing method of the optical material.

BACKGROUND ART

A plastic lens is lighter than an inorganic lens, is not easily broken, and is dyeable. Therefore, plastic lenses have become rapidly widespread as an optical element such as a spectacle lens or a camera lens. Hitherto, various resins for spectacle lenses have been developed and used. Typical examples of the resins include allyl resin obtained from diethylene glycol bisallyl carbonate or diallyl isophthalate, (meth)acryl resin obtained from (meth)acrylate, and thiopolyurethane resin obtained from isocyanate and thiol.

In recent years, urethane resins, which have a refractive index lower than that of thiourethane resins and are formed of isocyanate and an alcohol, have been developed (Patent documents 1 to 5). Although the refractive index of urethane resins is lower than the refractive index of thiourethane resins, the urethane resins are less expensive. Therefore, urethane resins are expected to be used as a lens material. For example, Patent Document 4 describes an urethane resin obtained from 4,4'-methylene-bis(cyclohexylisocyanate) as isocyanate and trimethylolpropane propoxylate and trimethylolpropane as alcohols.

As the isocyanate, there are tolylene diisocyanate and diphenylmethane diisocyanate which have a high refractive index and are available at low cost, and functional lenses or high-refractive index lenses using these polyisocyanate compounds are being studied.

In Patent Document 6, an example of manufacturing urethane resin by using tolylene diisocyanate, which is available at low cost, as the isocyanate is described in Comparative example 5. Examples of commercially available isocyanate include m-xylylene diisocyanate, 2,5-bis(isocyanatomethyl)-bicyclo[2.2.1]heptane, 2,6-bis(isocyanatomethyl)-bicyclo-[2.2.1]heptane, 1,3-bis(isocyanatomethyl)cyclohexane, hexamethylene diisocyanate, isophorone diisocyanate, 4,4'-methylene-bis(cyclohexylisocyanate), and the like. The market price of tolylene diisocyanate is the cheapest among these commercially available products. Therefore, if tolylene diisocyanate is used, cheaper spectacle lenses can be supplied to the market, and it can make a great industrial contribution. However, Comparative example 5, in which the example of manufacturing urethane resin by using tolylene diisocyanate is described, also describes that a cured substance is not obtained in some cases due to molding defect.

Patent Document 7 describes a plastic lens comprised of thiourethane resin that is obtained from a composition containing a polyisocyanate compound having an aromatic ring, a polythiol compound, a benzotriazole-based compound, and phenols. The document describes that a plastic lens having excellent weather resistance is obtained.

RELATED DOCUMENT

Patent Document

[Patent Document 1] Pamphlet of International Publication No. WO2008/92597
[Patent Document 2] PCT Japanese Translation Patent Publication No. 2009-520057
[Patent Document 3] Pamphlet of International Publication No. WO2010/43392
[Patent Document 4] Japanese Unexamined Patent Publication No. 2011-012141
[Patent Document 5] PCT Japanese Translation Patent Publication No. 2012-521478
[Patent Document 6] Japanese Unexamined Patent Publication No. 2008-144154
[Patent Document 7] Japanese Unexamined Patent Publication No. 2012-181268

DISCLOSURE OF THE INVENTION

In a lens comprised of urethane resin using aromatic polyisocyanate such as tolylene diisocyanate, the occurrence of yellowing is noticed. Therefore, the quality of the lens needs to be improved.

Comparative example 5 of Patent Document 6 describes that because a reaction occurs too fast during the polymerization of tolylene diisocyanate as aromatic isocyanate and an alcohol, a molded product is not obtained in some cases, because the reactivity of a urethane composition is higher than that of a thiourethane composition. Particularly, when aromatic isocyanate is used, the reactivity of the urethane composition is further increased. Accordingly, during blending, in a state in which heat is being produced, the viscosity of the urethane composition rapidly increases. Consequentially, it is difficult to cast the urethane composition into a mold, and the composition has a problem with workability at the time of blending or casting.

Regarding a plastic lens comprised of urethane resin, Patent Document 7 does not describe the improvement of light resistance.

Considering the problems of the related art, the present inventors conducted intensive examination so as to obtain a polymerizable composition for an optical material which makes it possible to obtain a polyurethane-molded product that exhibits excellent workability at the time of blending or casting and has an excellent refractive index, heat resistance, transparency, and light resistance.

As a result of conducting intensive examination, the present inventors found that when specific additives are contained in a transparent resin, which is polymerized under specific conditions by using aromatic isocyanate and a polyfunctional alcohol, a polyurethane-molded product having an excellent refractive index, heat resistance, transparency, and light resistance is obtained.

Furthermore, they also found a manufacturing method of the polyurethane-molded product. Based on these findings, the present inventors accomplished the present invention.

That is, the present invention is as follows.

[1] A polymerizable composition for an optical material, including (A) at least one kind of isocyanate having two or more isocyanato groups, which contains aromatic isocyanate, (B) at least one kind of alcohol having two or more hydroxyl groups, (C) an acidic phosphoric acid ester represented by the following Formula (1), and (D) a benzotriazole-based compound, in which a ratio of secondary hydroxyl groups to the total molar number of primary and secondary hydroxyl groups contained in the alcohol (B) is equal to or greater than 50%, and the benzotriazole-based compound (D) is contained in an amount of 1 part by weight to 11 parts by weight with respect to a total of 100 parts by weight of the isocyanate (A) and the alcohol (B),

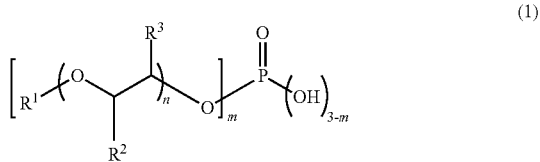

(1)

wherein, in the formula, m represents an integer of 1 or 2, n represents an integer of 0 to 18, $R^1$ represents an alkyl group having 1 to 20 carbon atoms, and each of $R^2$ and $R^3$ independently represents a hydrogen atom, a methyl group, or an ethyl group.

[2] The polymerizable composition for an optical material described in [1], in which the alcohol (B) contains at least one kind of compounds selected from among glycerol, diglycerol, trimethylolpropane, pentaerythritol, di(trimethylolpropane), an ethylene oxide adduct of glycerol, an ethylene oxide adduct of trimethylolpropane, an ethylene oxide adduct of pentaerythritol, a propylene oxide adduct of glycerol, a propylene oxide adduct of trimethylolpropane, and a propylene oxide adduct of pentaerythritol.

[3] The polymerizable composition for an optical material described in [1] or [2], in which the alcohol (B) contains at least one kind of compounds selected from among a propylene oxide adduct of glycerol, a propylene oxide adduct of trimethylolpropane, and a propylene oxide adduct of pentaerythritol.

[4] The polymerizable composition for an optical material described in any one of [1] to [3], in which the aromatic isocyanate is 2,4-tolylene diisocyanate or a mixture of 2,4-tolylene diisocyanate and 2,6-tolylene diisocyanate.

[5] The polymerizable composition for an optical material described in any one of [1] to [4], in which a molar ratio of the isocyanato groups of the isocyanate (A) to the hydroxyl groups of the alcohol (B) is 0.8 to 1.2.

[6] The polymerizable composition for an optical material described in any one of [1] to [5], in which the phosphoric acid ester (C) is contained in an amount of 0.1 parts by weight to 3 parts by weight with respect to the total of 100 parts by weight of the isocyanate (A) and the alcohol (B).

[7] The polymerizable composition for an optical material described in any one of [1] to [6], further including a hindered amine-based compound, in which the hindered amine-based compound is contained in an amount of 0.1 parts by weight to 2 parts by weight with respect to the total of 100 parts by weight of the isocyanate (A) and the alcohol (B).

[8] The polymerizable composition for an optical material described in any one of [1] to [7], in which the benzotriazole-based compound (D) is contained in an amount of 2.1 parts by weight to 10 parts by weight with respect to the total of 100 parts by mass of the isocyanate (A) and the alcohol (B).

[9] The polymerizable composition for an optical material described in any one of [1] to [8], further including (E) a phenol-based compound, in which the phenol-based compound (E) is contained in an amount of 0.5 parts by weight to 5 parts by weight with respect to the total of 100 parts by weight of the isocyanate (A) and the alcohol (B).

[10] A manufacturing method of a polyurethane-molded product, including a step of obtaining the polymerizable composition for an optical material described in any one of [1] to [8] by mixing the alcohol (B), the acidic phosphoric acid ester (C), and the benzotriazole-based compound (D) together and then mixing the resultant with at least one kind of the isocyanate (A), which contains aromatic isocyanate and has two or more isocyanato groups, at a temperature of equal to or less than 30° C., a step of casting the polymerizable composition into a casting mold, and a step of polymerizing the polymerizable composition by starting the polymerization of the composition at a temperature of equal to or less than 30° C.

[11] The manufacturing method of a polyurethane-molded product described in [10], in which the step of obtaining the polymerizable composition for an optical material includes a step of obtaining the polymerizable composition for an optical material described in [9] by mixing the alcohol (B), the acidic phosphoric acid ester (C), the benzotriazole-based compound (D), and the phenol-based compound (E) together and then mixing the resultant with at least one kind of the isocyanate (A), which contains aromatic isocyanate and has two or more isocyanato groups, at a temperature of equal to or less than 30° C.

[12] A manufacturing method of a plastic polarizing lens, including a step of obtaining the polymerizable composition for an optical material described in any one of [1] to [8] by mixing the alcohol (B), the acidic phosphoric acid ester (C), and the benzotriazole-based compound (D) together and then mixing the resultant with at least one kind of the isocyanate (A), which contains aromatic isocyanate and has two or more isocyanato groups, at a temperature of equal to or less than 30° C., a step of fixing a polarizing film in a casting mold for lens casting in a state in which at least one surface of the polarizing film is separated from the mold, a step of injecting the polymerizable composition into a space between the polarizing film and the mold, and a step of laminating a layer comprised of polyurethane resin over at least one surface of the polarizing film by polymerizing and curing the polymerizable composition by starting the polymerization of the composition at a temperature of equal to or less than 30° C.

[13] The manufacturing method of a plastic polarizing lens described in [12], in which the step of obtaining the polymerizable composition for an optical material includes a step of obtaining the polymerizable composition for an optical material described in [9] by mixing the alcohol (B), the acidic phosphoric acid ester (C), the benzotriazole-based compound (D), and the phenol-based compound (E) together and then mixing the resultant with at least one kind of the isocyanate (A) which contains aromatic isocyanate and has two or more isocyanato groups at a temperature of equal to or less than 30° C.

[14] A manufacturing method of a polyurethane-molded product, including a step (i) of obtaining a prepolymer by adding the alcohol (B) to the isocyanate (A) such that a ratio of the hydroxyl groups to the isocyanato groups of the isocyanate (A) falls into a range of 10 mol % to 20 mol % and reacting the isocyanate (A) with the alcohol (B) in the presence of the acidic phosphoric acid ester (C), the benzotriazole-based compound (D), and the hindered amine-based compound, a step (ii) of obtaining the polymerizable composition for an optical material described in any one of [1] to [8] by further adding the alcohol (B) to the prepolymer and mixing the alcohol (B) and the prepolymer together at a temperature of equal to or less than 30° C., and a step (iii)

of polymerizing the prepolymer and the alcohol (B) contained in the polymerizable composition.

[15] The manufacturing method described in [14], in which the step (i) includes a step of obtaining a prepolymer by adding the alcohol (B) to the isocyanate (A) such that the ratio of the hydroxyl groups to the isocyanato groups of the isocyanate (A) falls into a range of 10 mol % to 20 mol % and reacting the isocyanate (A) with the alcohol (B) in the presence of the acidic phosphoric acid ester (C), the benzotriazole-based compound (D), the phenol-based compound (E), and the hindered amine-based compound.

[16] The manufacturing method described in [14] or [15], in which in the step (i), the reaction temperature is equal to or less than 30° C.

[17] The manufacturing method described in any one of [14] to [16], in which in the step (iii), heating is started at a temperature of equal to or less than 30° C. when the prepolymer and the alcohol (B) are polymerized.

[18] The manufacturing method described in any one of [14] to [17], in which the viscosity of the prepolymer and the polymerizable composition is equal to or less than 1,000 Pa·s at 20° C.

[19] The manufacturing method described in any one of [14] to [18], in which the step (ii) is performed by a mixing apparatus including a cylindrical container, a shaft that has been inserted into the container from the upper portion of the container along the central axis direction of the container, a stirring blade that is wound in the form of a screw along the outer circumferential surface of the shaft, a first supply portion that is disposed in the upper portion of the container and supplies a solution of the prepolymer into the container, a second supply portion that is disposed in the upper portion of the container and supplies a solution of the alcohol (B) into the container, and an ejection portion that is disposed at the bottom of the container, and the step (ii) includes a step of supplying the prepolymer and the alcohol (B) into the container from the first supply portion and the second supply portion respectively and a step of preparing the polymerizable composition by rotating the shaft such that the prepolymer and the alcohol (B) are moved down while being mixed together at a temperature of equal to or less than 30° C. by the stirring blade, which is wound in the form of a screw along the outer circumferential surface of the shaft, and ejecting the obtained polymerizable composition from the ejection portion.

[20] The manufacturing method described in [19], in which a rotation frequency of the shaft is within a range of 1,000 rpm to 4,000 rpm, and a rate at which the polymerizable composition is ejected from the ejection portion is within a range of 0.5 g/s to 4.0 g/s.

[21] The manufacturing method described in [19] or [20], in which in the step (ii), the viscosity of the obtained polymerizable composition is equal to or less than 500 mPa·s at 20° C.

[22] The manufacturing method described in [19] or [21], in which the step (iii) includes a step of injecting the polymerizable composition into a mold and a step of polymerizing the prepolymer and the alcohol (B) contained in the polymerizable composition in the mold.

[23] A manufacturing method of a plastic polarizing lens, including a step of fixing a polarizing film in a casting mold for lens casting in a state in which at least one surface of the polarizing film is separated from the mold, before the step (iii) in the manufacturing method of a polyurethane-molded product described in any one of [14] to [22], in which the step (iii) includes a step of injecting the polymerizable composition obtained in the step (ii) into a space between the polarizing film and the mold and a step of laminating a layer comprised of polyurethane resin over at least one surface of the polarizing film by polymerizing and curing the polymerizable composition.

[24] A polyurethane-molded product obtained by the manufacturing method described in any one of [10], [11], and [14] to [22].

[25] An optical material comprised of the polyurethane-molded product described in [24].

[26] A plastic lens comprised of the optical material described in [25].

[27] A plastic polarizing lens obtained by the manufacturing method described in [12], [13], or [23].

According to the polymerizable composition for an optical material of the present invention, it is possible to obtain a urethane-molded product which exhibits excellent workability at the time of blending or casting and has an excellent refractive index, heat resistance, transparency, and light resistance. That is, it is possible to obtain a polyurethane-molded product in which the aforementioned properties are balanced well. Such a polyurethane-molded product can be suitably used in various optical materials that are required to have a high degree of transparency.

DESCRIPTION OF EMBODIMENTS

Figure 1:
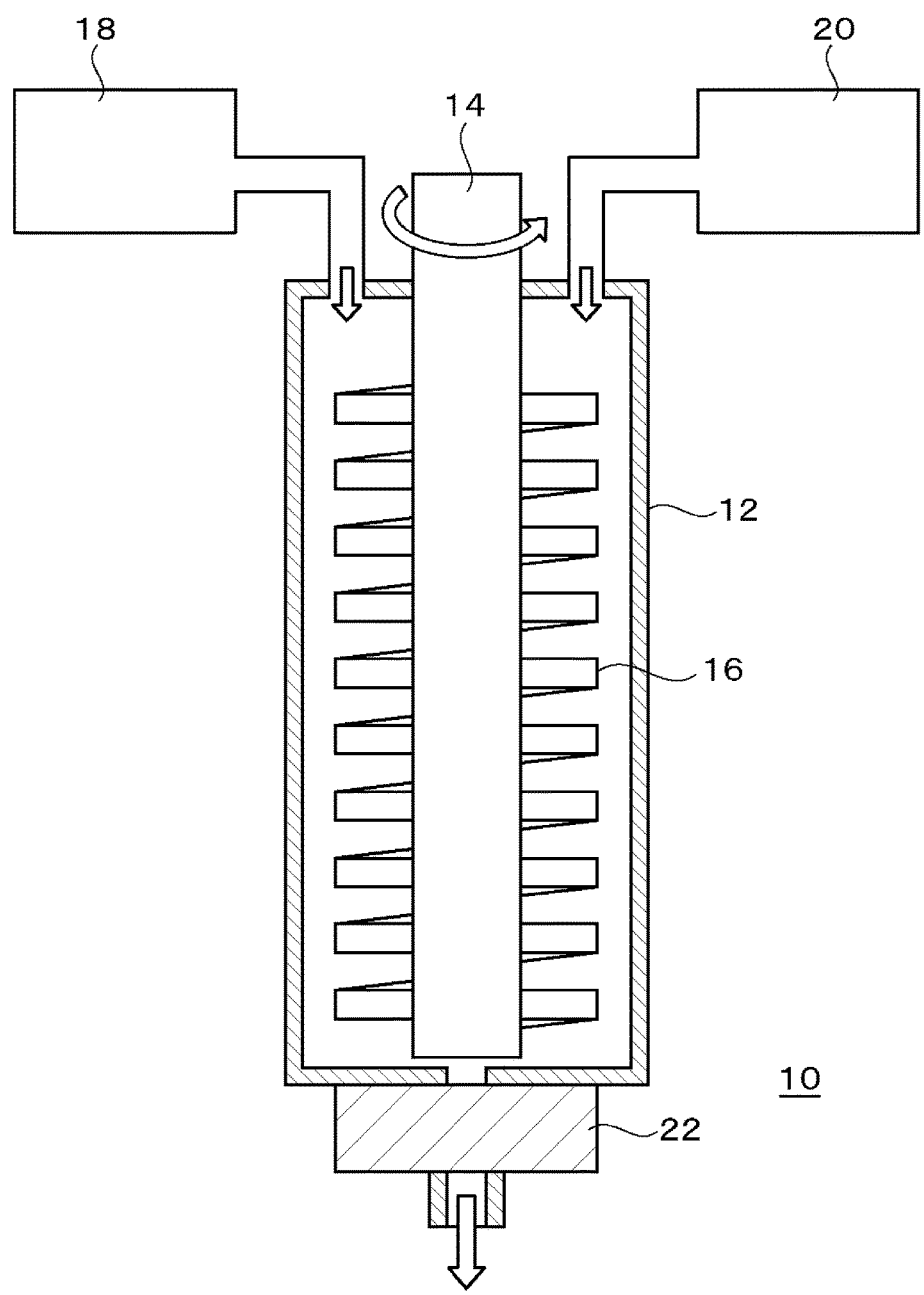
FIG. 1 is a schematic cross-sectional view of a mixing apparatus in the present embodiment.

Hereinafter, embodiments of the polymerizable composition for an optical material of the present invention will be described by using specific examples.

The polymerizable composition for an optical material of the present embodiment contains (A) at least one kind of isocyanate having two or more isocyanato groups, which contains aromatic isocyanate, (B) at least one kind of alcohol having two or more hydroxyl groups, (C) an acidic phosphoric acid ester represented by the following Formula (1), and (D) a benzotriazole-based compound. A ratio of secondary hydroxyl groups to the total molar number of primary and secondary hydroxyl groups contained in the alcohol (B) is equal to or greater than 50%, and the benzotriazole-based compound (D) is contained in the polymerizable composition, in an amount of 1 part by weight to 11 parts by weight with respect to a total of 100 parts by weight of the isocyanate (A) and the alcohol (B).

Hereinafter, each of the components will be described.

[Isocyanate (A)]

The isocyanate (A) is at least one kind of isocyanate having two or more isocyanato groups, which contains aromatic isocyanate. The aromatic isocyanate is the isocyanate, in which two or more isocyanato groups have directly bound to an aromatic ring, and may contain a dimer, a trimer, or a prepolymer. Specific examples of the aromatic isocyanate include tolylene diisocyanate, 4,4'-diphenylmethane diisocyanate, phenylene diisocyanate, and the like. One kind of the aromatic isocyanate can be used singly, or two or more kinds thereof can be used in combination. The isocyanate (A) contains the aromatic isocyanate in an amount of 80% by weight to 100% by weight.

The aromatic isocyanate in the present embodiment preferably contains tolylene diisocyanate and is more preferably formed of tolylene diisocyanate. The tolylene diisocyanate is at least one kind of isocyanate selected from among 2,4-tolylene diisocyanate and 2,6-tolylene diisocyanate. Examples of the tolylene diisocyanate include 2,4-tolylene diisocyanate, 2,6-tolylene diisocyanate, and a mixture of 2,4-tolylene diisocyanate and 2,6-tolylene diisocyanate.

In the present embodiment, the tolylene diisocyanate preferably contains 2,4-tolylene diisocyanate. Specifically, 2,4-tolylene diisocyanate can be used singly, or alternatively, a mixture of 2, 4-tolylene diisocyanate and 2, 6-tolylene diisocyanate can be used. When such a mixture is used, a mixing ratio between 2,4-tolylene diisocyanate and 2,6-tolylene diisocyanate is preferably within a range of 75:25 to 85:15.

In the present embodiment, the isocyanate (A) can contain isocyanate having two or more isocyanato groups, in addition to the aromatic isocyanate. Examples of such isocyanate include aliphatic isocyanate, alicyclic isocyanate, heterocyclic isocyanate, and the like.

Examples of the aliphatic isocyanate include hexamethylene diisocyanate, 2,2,4-trimethylhexamethylene diisocyanate, 2,4,4-trimethylhexamethylene diisocyanate, lysine diisocyanate methyl ester, lysine triisocyanate, m-xylylene diisocyanate, α,α,α',α'-tetramethylxylylene diisocyanate, bis(isocyanatomethyl) naphthaline, mesitylene triisocyanate, bis(isocyanatomethyl) sulfide, bis(isocyanatoethyl) sulfide, bis(isocyanatomethyl)disulfide, bis(isocyanatoethyl)disulfide, bis(isocyanatomethylthio)methane, bis(isocyanatoethylthio)methane, bis(isocyanatoethylthio)ethane, bis(isocyanatomethylthio)ethane, and the like.

Examples of the alicyclic isocyanate include isophorone diisocyanate, bis(isocyanatomethyl)cyclohexane, dicyclohexylmethane diisocyanate, cyclohexane diisocyanate, methyl cyclohexane diisocyanate, dicyclohexyl dimethylmethane isocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane, and the like.

Examples of the heterocyclic isocyanate include 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, and the like.

In the present embodiment, a molar ratio of the isocyanato groups of the isocyanate (A) to the hydroxyl groups of the alcohol (B), which will be described later, is within a range of 0.8 to 1.2, preferably within a range of 0.85 to 1.2, and even more preferably within a range of 0.9 to 1.2. Within the above range, it is possible to obtain an optical material which has excellent optical characteristics such as refractive index and in which physical properties are balanced well. Particularly, it is possible to obtain a resin that can be suitably used as a spectacle lens.

[Alcohol (B)]

In the alcohol (B), a ratio of secondary hydroxyl groups to the total molar number of primary and secondary hydroxyl groups is equal to or greater than 50%. The alcohol (B) may be constituted with one kind of alcohol in which the ratio of the secondary hydroxyl groups is equal to or greater than 50%, or may be constituted with two or more kinds of compounds in which the ratio of the secondary hydroxyl groups is equal to or greater than 50%. Considering the workability, the ratio of the secondary hydroxyl groups to the total molar number of the primary and secondary hydroxyl groups is preferably equal to or greater than 60% and more preferably equal to or greater than 70%.

The ratio of the secondary hydroxyl groups can be calculated by proton nuclear magnetic resonance spectroscopy, $^1$H-NMR. In a methylene group ($-CH_2-(OH)$) and a methine group ($-CH(R)-(OH)$) in which hydroxyl groups are adjacent to each other, the chemical shifts of protons are overlapped with each other in a broad area. Accordingly, the chemical shifts cannot be individually differentiated. However, when the hydroxyl groups are esterified by carboxylic acid having an electron-attracting group such as trifluoroacetic acid, the chemical shift occurs in a low magnetic field, and as a result, protons of the methylene group and the methine group can be differentiated. For example, when the hydroxyl groups are esterified by trifluoroacetic anhydride, generally, the protons of the methine group undergo a chemical shift of 5.3 ppm to 5.6 ppm, and the protons of the methylene group undergo a chemical shift of 4.2 ppm to 4.5 ppm. Consequentially, from the ratio of an integral value of the peak thereof, the ratio of the secondary hydroxyl groups can be calculated. Provided that the integral value of the chemical shift of 5.3 ppm to 5.6 ppm is A, and the integral value of the chemical shift of 4.2 ppm to 4.5 ppm is B, a ratio X of the secondary hydroxyl groups can be calculated by the following equation.

$$X=A/(A+B/2)\times 100$$

The alcohol (B) is at least one kind of aliphatic or alicyclic alcohol. Specific examples thereof include linear or branched aliphatic alcohols, alicyclic alcohols, alcohols obtained by adding ethylene oxide, propylene oxide, or ε-caprolactone to the aforementioned alcohols, and the like.

Examples of the linear or branched aliphatic alcohols include ethylene glycol, diethylene glycol, triethylene glycol, propylene glycol, dipropylene glycol, tripropylene glycol, 1,3-propanediol, 2,2-dimethyl-1,3-propanediol, 2,2-diethyl-1,3-propanediol, 1,2-butanediol, 1,3-butanediol, 1,4-butanediol, 3-methyl-1,3-butanediol, 1,2-pentanediol, 1,3-pentanediol, 1,5-pentanediol, 2,4-pentanediol, 2-methyl-2,4-pentanediol, 3-methyl-1,5-pentanediol, 1,6-hexanediol, 2,5-hexanediol, glycerol, diglycerol, polyglycerol, trimethylolpropane, pentaerythritol, di(trimethylolpropane), and the like.

Examples of the alicyclic alcohols include 1, 2-cyclopentanediol, 1, 3-cyclopentanediol, 3-methyl-1,2-cyclopentanediol, 1,2-cyclohexanediol, 1,3-cyclohexanediol, 1,4-cyclohexanediol, 4,4'-bicyclohexanol, 1,4-cyclohexanedimethanol, and the like.

The alcohol (B) may be a compound obtained by adding ethylene oxide, propylene oxide, or ε-caprolactone to the above alcohols. Examples of the compound include an ethylene oxide adduct of glycerol, an ethylene oxide adduct of trimethylolpropane, an ethylene oxide adduct of pentaerythritol, a propylene oxide adduct of glycerol, a propylene oxide adduct of trimethylolpropane, a propylene oxide adduct of pentaerythritol, caprolactone-modified glycerol, caprolactone-modified trimethylolpropane, caprolactone-modified pentaerythritol, and the like.

The molar number of ethylene oxide, propylene oxide, or ε-caprolactone added to the alcohols is preferably 0.7 moles to 3.0 moles and more preferably 0.7 moles to 2.0 moles with respect to 1 mole of hydroxyl groups in the alcohols.

In the present embodiment, as the alcohol (B), at least one kind selected from among ethylene glycol, diethylene glycol, triethylene glycol, propylene glycol, dipropylene glycol, tripropylene glycol, glycerol, diglycerol, polyglycerol, trimethylolpropane, pentaerythritol, di(trimethylolpropane), an ethylene oxide adduct of glycerol, an ethylene oxide adduct of trimethylolpropane, an ethylene oxide adduct of pentaerythritol, a propylene oxide adduct of glycerol, a propylene oxide adduct of trimethylolpropane, and a propylene oxide adduct of pentaerythritol are preferably used; and at least one kind selected from among glycerol, diglycerol, trimethylolpropane, pentaerythritol, di(trimethylolpropane), an ethylene oxide adduct of glycerol, an ethylene oxide adduct of trimethylolpropane, an ethylene oxide adduct of pentaerythritol, a propylene oxide adduct of glycerol, a propylene oxide adduct of trimethylolpropane, and a propylene oxide adduct of pentaerythritol are more preferably used.

In the present embodiment, it is particularly preferable for the alcohol (B) to contain at least one kind selected from among a propylene oxide adduct of glycerol, a propylene oxide adduct of trimethylolpropane, and a propylene oxide adduct of pentaerythritol.

As the propylene oxide adduct of glycerol, an adduct is preferable in which the amount of propylene oxide added to glycerol is 0.7 moles to 1.3 moles with respect to 1 mole of hydroxyl groups in the glycerol. A hydroxyl value of the adduct is preferably from 520 mg KOH/g to 810 mg KOH/g, and more preferably from 580 mg KOH/g to 680 mg KOH/g. As the propylene oxide adduct of trimethylolpropane, an adduct is preferable in which the amount of propylene oxide added to trimethylolpropane is 0.8 moles to 1.3 moles with respect to 1 mole of hydroxyl groups in the trimethylolpropane. A hydroxyl value of the adduction is preferably from 460 mg KOH/g to 600 mg KOH/g, and more preferably from 520 mg KOH/g to 580 mg KOH/g. The hydroxyl value can be measured by a known method.

[Acidic Phosphoric Acid Ester (C)]

The acidic phosphoric acid ester (C) is represented by Formula (1) and has been used as a release agent in the related art. However, in the present embodiment, the acidic phosphoric acid ester (C) is also used as urethanation catalyst.

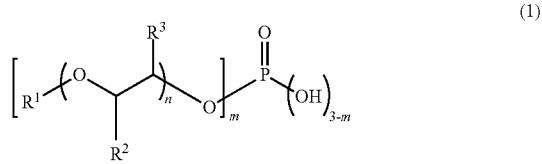

(1)

In the formula, m represents an integer of 1 or 2, n represents an integer of 0 to 18, $R^1$ represents an alkyl group having 1 to 20 carbon atoms, and each of $R^2$ and $R^3$ independently represents a hydrogen atom, a methyl group, or an ethyl group. The unit in the "$[\ ]_m$" preferably has 4 to 20 carbon atoms.

Examples of $R^1$ in Formula (1) include organic residues derived from linear aliphatic compounds such as methane, ethane, propane, butane, pentane, hexane, heptane, octane, nonane, decane, undecane, dodecane, tetradecane, and hexadecane; organic residues derived from branched aliphatic compounds such as 2-methylpropane, 2-methylbutane, 2-methylpentane, 3-methylpentane, 3-ethylpentane, 2-methylhexane, 3-methylhexane, 3-ethylhexane, 2-methylheptane, 3-methylheptane, 4-methylheptane, 3-ethylheptane, 4-ethylheptane, 4-propylheptane, 2-methyloctane, 3-methyloctane, 4-methyloctane, 3-ethyloctane, 4-ethyloctane, and 4-propyloctane; organic residues derived from alicyclic compounds such as cyclopentane, cyclohexane, 1,2-dimethylcyclohexane, 1,3-dimethylcyclohexane, and 1,4-dimethylcyclohexane; and the like. However, $R^1$ is not limited to these example compounds and may be in the form of a mixture thereof.

Furthermore, in Formula (1), n is preferably 0, and the compound can be represented by Formula (2).

(2)

In Formula (2), x represents an integer of 1 or 2, and $R^4$ represents an alkyl group having 8 to 16 carbon atoms.

Examples of $R^4$ in Formula (2) include organic residues derived from linear aliphatic compounds such as octane, nonane, decane, undecane, dodecane, tetradecane, and hexadecane; organic residues derived from branched aliphatic compounds such as 2-ethylhexane, 3-ethylhexane, 2-methylheptane, 3-methylheptane, 4-methylheptane, 3-ethylheptane, 4-ethylheptane, 4-propylheptane, 2-methyloctane, 3-methyloctane, 4-methyloctane, 3-ethyloctane, 4-ethyloctane, and 4-propyloctane; organic residues derived from alicyclic compounds such as 1,2-dimethylcyclohexane, 1,3-dimethylcyclohexane, and 1,4-dimethylcyclohexane; and the like. However, $R^4$ is not limited to these example compounds and may be in the form of a mixture thereof.

As the acidic phosphoric acid ester (C), Zelec UN manufactured by Stepan Company, internal release agents for MR manufactured by Mitsui Chemicals, Inc., a JP series manufactured by JOHOKU CHEMICAL CO., LTD., a Phosphanol series manufactured by TOHO Chemical Industry Co., Ltd., an AP or DP series manufactured by DAIHACHI CHEMICAL INDUSTRY CO., LTD., and the like can be used. Among these, Zelec UN manufactured by Stepan Company and internal release agents for MR manufactured by Mitsui Chemicals, Inc. are more preferable.

The amount of the acidic phosphoric acid ester (C) is preferably 0.1 parts by weight to 3 part by weight, and more preferably 0.2 parts by weight to 2 parts by weight with respect to a total of 100 parts by weight of the isocyanate (A) and the alcohol (B).

Generally, as a catalyst for urethane resins, tertiary amine, an aminocarboxylic acid salt, a metal catalyst, or the like is used. If such a catalyst is used for the polymerizable composition for an optical material of the present embodiment, the reactivity increases. Therefore, the viscosity of the polymerizable composition for an optical material of the present embodiment increases too much at the time of injecting the composition into a mold, workability deteriorates, and as a result, striae occurs in the obtained molded product in some cases. In the present embodiment, when specific cyclic amines are used concurrently with a specific acidic phosphoric acid ester, it is preferable since workability at the time of blending and casting becomes better, the occurrence of striae is effectively inhibited, and the molded product formed of isocyanate and an alcohol of the present embodiment that is applicable to spectacles can be manufactured with high quality and excellent workability.

Examples of the specific cyclic amines include imidazoles such as imidazole, 1,2-dimethylimidazole, benzylmethyl imidazole, 2-ethyl-4-imidazole; and hindered amines as 1,2,2,6,6-piperidine compounds such as 1,2,2,6,6-pentamethyl-4-piperidinol, 1,2,2,6,6-pentamethyl-4-hydroxyethyl-4-piperidinol, methyl-1,2,2,6,6-pentamethyl-4-piperidyl sebacate, a mixture of methyl-1,2,2,6,6-pentamethyl-4-piperidyl sebacate and bis(1,2,2,6,6-pentamethyl-4-piperidyl) sebacate, bis(1,2,2,6,6-pentamethyl-4-piperidyl)sebacate, bis(2,2,6,6-tetramethyl-1-(octyloxy)-4-piperidyl)sebacate, bis(1,2,2,6,6-pentamethyl-4-piperidyl) [[3,5-bis(1,1-dimethylethyl)-4-hydroxyphenyl]methyl]butyl malonate, and tetrakis(1,2,2,6,6-pentamethyl-4-piperidyl) butane-1,2,3,4-tetracarboxylate.

As the cyclic amines, imidazoles, hindered amines, and the like are preferable, and hindered amines are more preferable.

The acidic phosphoric acid ester (C) can be concurrently used the hindered amines. The hindered amines can be contained in an amount of 0.1 parts by weight to 2 parts by weight and preferably in an amount of 0.2 parts by weight to 1.5 parts by weight with respect to a total of 100 parts by weight of the isocyanate (A) and the alcohol (B). Within the above range, it is possible to obtain a molded product which has excellent color and in which the occurrence of striae is inhibited.

Hindered amine is used as a light stabilizer. Examples of commercially available products thereof include Lowilite 76 and Lowilite 92 manufactured by Chemtura Corporation, Tinuvin 144, Tinuvin 292, and Tinuvin 765 manufactured by BASF Corporation, Adeka Stab LA-52 and LA-72 manufactured by ADEKA CORPORATION, JF-95 manufactured by JOHOKU CHEMICAL CO., LTD., and the like.

In the present embodiment, from the viewpoint of the aforementioned effects, it is preferable to use tolylene diisocyanate as the isocyanate (A) in combination with at least one kind of compound selected from among a propylene oxide adduct of glycerol, a propylene oxide adduct of trimethylolpropane, and a propylene oxide adduct of pentaerythritol as the alcohol (B).

[Benzotriazole-Based Compound (D)]

The benzotriazole-based compound (D) may be a compound having a benzotriazole skeleton. Examples thereof include 2-(2'-hydroxy-5'-methylphenyl)benzotriazole, 2-(2'-hydroxy-4'-ethoxyphenyl)benzotriazole, 2-(2'-hydroxy-5'-tert-butylphenyl)benzotriazole, 2-(2-hydroxy-5-tert-octylphenyl)-2H-benzotriazole, 2-(2'-hydroxy-3',5'-di-tert-butylphenyl)benzotriazole, 2-(2'-hydroxy-3',5'-di-tert-amylphenyl)benzotriazole, 2-(2'-hydroxy-4'-octyloxyphenyl)benzotriazole, 2-(2'-hydroxy-3',5'-bis(dimethylbenzyl)phenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-3'-dodecyl-5'-methylphenyl)benzotriazole, 2-{2'-hydroxy-3'-dimethylbenzyl-5'-(1,1,3,3-tetramethyl)phenyl}benzotriazole, and the like.

These benzotriazole-based compounds may be used singly, or two or more kinds thereof may be used in combination.

Among these, from the viewpoint of solubility in the components (A) and (B) in the composition, the composition preferably contains 2-(2-hydroxy-5-tert-octylphenyl)-2H-benzotriazole, and particularly preferably contains only 2-(2-hydroxy-5-tert-octylphenyl)-2H-benzotriazole.

The amount of the benzotriazole-based compound (D) contained in the composition is 1 part by weight to 11 parts by weight, preferably 1 part by weight to 10 parts by weight, more preferably 2.1 parts by weight to 10 parts by weight, and particularly preferably 2.5 parts by weight to 10 parts by weight, with respect to a total of 100 parts by weight of the isocyanate (A) and the alcohol (B). When the amount of the benzotriazole-based compound (D) contained in the composition is within the above range, it is possible to obtain a urethane-molded product which exhibits excellent workability at the time of mixing or casting and has an excellent refractive index, heat resistance, transparency, and light resistance. That is, it is possible to obtain a urethane-molded product in which the aforementioned properties are balanced well. Such a urethane-molded product is suitably used particularly as a spectacle lens.

[Phenol-Based Compound (E)]

In the present embodiment, the polymerizable composition can further contain a phenol-based compound (E).

Examples of the phenol-based compound (E) include phenol, substituted phenols such as cresol, ethyl phenol, isopropyl phenol, tert-butyl phenol, hexyl phenol, cyclohexyl phenol, 2-methoxyphenol, 4-methoxyphenol, 2,6-dimethyl-p-cresol, 2,6-diethyl-p-cresol, 2,6-di-n-propyl-p-cresol, 2,6-diisopropyl-p-cresol, 2,6-di-n-butyl-p-cresol, 2,6-diisobutyl-p-cresol, and 4-allyl-2-methoxyphenol, 2,4-bis[(octylthio)methyl]-o-cresol, hindered phenols, polyphenols such as catechol, resorcin, hydroquinone, tert-butyl catechol, and pyrogallol, biphenols such as biphenol and dimethyl biphenol, bisphenols such as bisphenol A, bisphenol F, bisphenol S, methylene-bis(methyl-tert-butylphenol), and thio-bis(methyl-tert-butylphenol), naphthols such as naphthol and dihydroxynaphthalene, compounds obtained when these phenols are substituted with halogen, and the like.

Among the above, from the viewpoint of the external appearance of a plastic lens to be obtained, the phenol-based compound (E) is preferably the hindered phenols, and more preferably an alkyl group, a methyl group, or a tert-butyl group having a (3-tert-butyl-4-hydroxy-5-alkyl)phenyl group.

Examples of the hindered phenol-based compound having the (3-tert-butyl-4-hydroxy-5-alkyl)phenyl group include 2,6-di-tert-butyl-p-cresol, 1, 6-hexamethylene-bis[3-(3, 5-di-tert-butyl-4-hydroxyphenyl)propionate], 2, 4-bis(octylthio)-6-(4-hydroxy-3, 5-di-tert-butylamino)-1, 3, 5-triazine, pentaerythritol tetrakis[3-(3, 5-di-tert-butyl-4-hydroxyphenyl)propionate], triethylene glycol-bis[3-(3-tert-butyl-5-methyl-4-hydroxyphenyl)propionate], 2,2-thio-diethylene-bis[3-(3,5-di-tert-butyl-4-hydroxyphenyl)propionate], octadecyl-3-(3,5-di-tert-butyl-4-hydroxyphenyl)propionate, N—N'-hexamethylenebis(3,5-di-tert-butyl-4-hydroxy-hydrocinnamamide), 3,5-di-tert-butyl-4-hydroxybenzyl phosphonate diethyl ester, 1,3,5-trimethyl-2,4,6-tris(3,5-di-tert-butyl-4-hydroxybenzyl)benzene, tris(3,5-di-tert-butyl-4-hydroxybenzyl)isocyanurate, isooctyl-3-(3,5-di-tert-butyl-4-hydroxyphenyl)propionate, and the like.

Among these, from the viewpoint of solubility in the components (A) and (B) in the composition, it is preferable to use 2,6-di-tert-butyl-p-cresol.

These phenol-based compounds can be used singly, or two or more kinds thereof may be used in combination.

The content of the phenol-based compound (E) is 0.5 parts by weight to 5 parts by weight, preferably 0.5 parts by weight to 4 parts by weight, and particularly preferably 0.5 parts by weight to 2 parts by weight, with respect to a total of 100 parts by weight of the isocyanate (A) and the alcohol (B).

[Components Other than Components (A) to (E)]

According to the purpose, the polymerizable composition for an optical material of the present embodiment can contain additives such as a light stabilizer, an ultraviolet absorber, an antioxidant, a coloring inhibitor, a dye, and a resin modifier.

As the light stabilizer, hindered amine-based compounds can be used. Examples of commercially available products of the hindered amine-based compounds include Lowilite 76 and Lowilite 92 manufactured by Chemtura Corporation, Tinuvin 144, Tinuvin 292, and Tinuvin 765 manufactured by BASF Corporation, Adeka Stab LA-52 and LA-72 manufactured by ADEKA CORPORATION, JF-95 manufactured by JOHOKU CHEMICAL CO., LTD., and the like.

The ultraviolet absorber can contain a triazine-based compound, a benzophenone-based compound, or a benzoate-based compound. The amount of the ultraviolet absorber added is preferably 0.05 parts by weight to 2.0 parts by weight and more preferably 0.05 parts by weight to 1.5 parts by weight, with respect to a total of 100 parts by weight of the components (A) and (B).

When thiol is added as an additive to the polymerizable composition of for an optical material the present embodiment, light resistance of the product markedly deteriorates. When a primary amine and a secondary amine are added as amines to the composition, a reaction between the amines and the isocyanate of the present embodiment proceeds rapidly, and consequentially, the viscosity of the polymerizable composition for an optical material increases too much at the time of casting. As a result, workability deteriorates, or striae occur in the obtained molded product. The problems caused by the addition of a metal catalyst are as described above. In many cases, an organic tin compound is used as a metal catalyst in a thiourethane resin. The polymerizable composition for an optical material of the present embodiment does not contain the organic tin compound, which has become an issue due to its harmfulness to the human body resulting from high toxicity and endocrine disruptor, and makes it possible to manufacture a resin used for spectacles. Accordingly, the safety of the manufacturing process thereof or the safety of the obtained molded product is much higher.

In the present embodiment, from the viewpoint of further improving the workability at the time of blending or casting and effectively inhibiting the occurrence of striae, it is preferable to use tolylene diisocyanate as the isocyanate (A) in combination with at least one kind of compound selected from among a propylene oxide adduct of glycerol, a propylene oxide adduct of trimethylolpropane, and a propylene oxide adduct of pentaerythritol as the alcohol (B).

According to the polymerizable composition for an optical material of the present embodiment, it is possible to obtain a urethane-molded product which exhibits excellent workability at the time of blending or casting and has an excellent refractive index, heat resistance, transparency, and light resistance. That is, according to the present embodiment, it is possible to obtain a urethane-molded product in which the above properties are balanced well.

[Use]

By varying the mold used at the time of cast polymerization, the urethane-molded product of the present embodiment can be obtained in various forms. Having a high degree of transparency, the urethane-molded product of the present embodiment can be used for various purposes such as a plastic lens, a camera lens, a Light Emitting Diode (LED), a prism, optical fiber, an information recording substrate, a filter, and optical resin for a light emitting diode or the like. Particularly, the urethane-molded product is suitable as an optical material and an optical element such as a plastic lens, a camera lens, and a light emitting diode.

Examples of the plastic lens include a plastic spectacle lens comprised of polyurethane resin and a plastic polarizing lens in which a layer formed of polyurethane resin has been laminated over at least one surface of a polarizing film.

Hereinafter, a manufacturing method of a urethane-molded product and a manufacturing method of a plastic polarizing lens will be described based on a first embodiment and a second embodiment respectively by appropriately using drawings. Herein, the same constituents are marked with the same reference numerals, and the description thereof will not be repeated.

First Embodiment

Manufacturing Method of Urethane-Molded Product

The manufacturing method of a urethane-molded product of the present embodiment includes a step (1) of obtaining the aforementioned polymerizable composition for an optical material by mixing the alcohol (B), the acidic phosphoric acid ester (C), and the benzotriazole-based compound (D) together and then mixing the resultant with the isocyanate (A) at a temperature of equal to or less than 30° C., a step (2) of casting the polymerizable composition into a casting mold, and a step (3) of polymerizing the composition by starting polymerization of the polymerizable composition.

[Step (1)]

When the isocyanate (A) is mixed with the acidic phosphoric acid ester (C), white solids having low solubility are precipitated in some cases. Therefore, if the polymerizable composition is polymerized in this state, the transparency of the resin to be obtained deteriorates, and thus the resin becomes unsuitable for being used for spectacles in some cases. Accordingly, it is preferable to mix the alcohol (B) and the acidic phosphoric acid ester (C) together first and then mix the resultant with the isocyanate (A). When the components are mixed in this way, the occurrence of the white solids having low solubility is inhibited, and a molded product having excellent transparency is obtained.

The temperature at the time of mixing the isocyanate (A) is preferably equal to or less than 30° C., because the viscosity of the polymerizable composition for an optical material is kept low, and thus a molded product can be manufactured without deteriorating the workability. When tolylene diisocyanate is used as the isocyanate (A), it is particularly preferable to control the temperature to be equal to or less than 30° C.

When the polymerizable composition contains the alcohol (B), the acidic phosphoric acid ester (C), the benzotriazole-based compound (D), and a phenol-based compound, the step (1) can include a step of mixing components (B), (C), and (D) with the phenol-based compound (E) and then mixing the resultant with the isocyanate (A) at a temperature of equal to or less than 30° C.

The mixing apparatus is not particularly limited, and it is possible to use the apparatus which will be described later.

[Step (2)]

In this step, the polymerizable composition for an optical material of the present embodiment is injected into a mold (casting mold) held by a gasket, a tape, or the like. At this time, depending on the physical properties required for the molded product to be obtained, if necessary, it is preferable to perform degassing processing under reduced pressure or filtration processing such as pressurization or pressure reduction.

[Step (3)]

In this step, the polymerization of the polymerizable composition for an optical material that has been cast into the mold is started so as to polymerize the composition. The temperature at which the polymerization is started is preferably equal to or less than 30° C., because at this temperature, release properties of the molded product obtained after the polymerization become excellent, and striae does not occur in the obtained molded product. The polymerization conditions are not limited, because the conditions greatly vary with the type of the isocyanate or the alcohol used, the shape of the mold, and the like. However, the polymerization is performed at a temperature of about 0° C. to 140° C. for 1 hour to 48 hours.

Because the procedure for preparing the polymerizable composition greatly varies with the type of the isocyanate (A), the alcohol (B) and the additives used and the amount thereof used, the method of adding the additives is not particularly limited and is appropriately selected in consideration of the solubility of the additives, operability, safety, convenience, and the like.

If necessary, the urethane-molded product of the present embodiment may be subjected to processing such as annealing. The processing temperature is generally within a range of 50° C. to 150° C. However, the processing is preferably performed at a temperature of 90° C. to 140° C., and more preferably performed at a temperature of 100° C. to 130° C.

If necessary, a plastic lens comprised of the urethane-molded product of the present embodiment may be used after a coating layer is provided over one or both surfaces of the lens. Examples of the coating layer include a primer layer, a hard coat layer, an antireflection layer, an antifogging coating layer, an antifouling layer, a water repellent layer, and the like. Each of these coating layers may be used singly, or a plurality of the coating layers may be used in the form of a multi-layer. When the coating layer is provided over both surfaces of the plastic lens, the same coating layer or different coating layers may be provided over the respective surfaces.

For each of the coating layers, an ultraviolet absorber for protecting the lens or the eye from ultraviolet rays, an infrared absorber for protecting the eye from infrared rays, a light stabilizer or an antioxidant for improving light resistance of the lens, a dye or a pigment for making the lens more fashionable, a photochromic dye, a photochromic pigment, an antistatic agent, and other known additives for improving the performance of the lens may be concurrently used. For the layer to be subjected to coating, various leveling agents for improving coating properties may be used.

The primer layer is generally formed between the hard coat layer, which will be described later, and the optical lens. The primer layer is a coating layer for improving the adhesiveness between the hard coat layer to be formed over the primer layer and the lens. In some cases, the primer layer can also improve the impact resistance. For the primer layer, any material can be used as long as it exhibits a high degree of adhesiveness with respect to the obtained lens. However, generally, a primer composition or the like that contains a urethane-based resin, an epoxy-based resin, a polyester-based resin, a melanin-based resin, or polyvinylacetal as a main component is used. In order to adjust the viscosity of the primer composition, an appropriate solvent that does not exert an influence on the lens may be used for the primer composition. Needless to say, a solvent may not be used for the primer composition.

The primer composition can be formed by any of a coating method and a dry method. When the coating method is used, the lens is coated with the primer composition by a known coating method such as spin coating or dip coating, and then the resultant is solidified, whereby the primer layer is formed. When the dry method is used, the primer layer is formed by a known dry method such as a CVD method or a vacuum deposition method. In forming the primer layer, if necessary, in order to improve the adhesiveness, the lens surface may be subjected to preprocessing such as alkali processing, plasma processing, or ultraviolet processing.

The hard coat layer is a coating layer for giving functions such as scratch resistance, abrasion resistance, moisture resistance, hot water resistance, heat resistance, and light resistance to the lens surface.

For the hard coat layer, generally, a hard coat composition is used which contains an organic silicon compound having curability, at least one kind of oxide particles of an element selected from the group of elements including Si, Al, Sn, Sb, Ta, Ce, La, Fe, Zn, W, Zr, In, and Ti and/or at least one kind of particles composed of a composite oxide of two or more kinds of elements selected from the group of elements.

The hard coat composition preferably contains at least any of amines, amino acids, metal acetylacetonate complexes, organic acid metal salts, perchloric acids, salts of perchloric acids, acids, metal chlorides, and polyfunctional epoxy compounds, in addition to the aforementioned components. For the hard coat composition, an appropriate solvent that does not exert an influence on the lens may be used. Needless to say, a solvent may not be used for the composition.

Generally, the lens is coated with the hard coat composition by a known coating method such as spin coating or dip coating, and then the composition is cured, whereby the hard coat layer is formed. Examples of curing methods include thermal curing, curing methods performed by irradiation of energy rays such as ultraviolet rays or visible rays, and the like. In order to inhibit formation of interference fringes, a difference between the refractive index of the hard coat layer and the refractive index of the lens is preferably within a range of ±0.1.

Generally, the antireflection layer is formed on the hard coat layer if necessary. The antireflection layer is classified into an inorganic antireflection layer and an organic antireflection layer. The inorganic antireflection layer is formed of an inorganic oxide such as $SiO_2$ or $TiO_2$ by a dry method such as a vacuum deposition method, a sputtering method, an ion plating method, an ion beam-assisted method, and a CVD method. The organic antireflection layer is formed of a composition, which contains an organic silicon compound and silica-based particles having internal cavities, by a wet method.

The antireflection layer is composed of a single layer or multiple layers. When it is used in the form of a single layer, a value obtained by subtracting the refractive index of the antireflection layer from the refractive index of the hard coat layer is preferably at least equal to or greater than 0.1. In order to cause the antireflection layer to effectively perform an antireflection function, it is preferable to constitute the antireflection film with multiple films, and in this case, a film with a low refractive index and a film with a high refractive index are alternately laminated on each other. Even in this case, a difference in a refractive index between the film with a low refractive index and the film with a high refractive index is preferably equal to or greater than 0.1. Examples of the film with a high refractive index include films of ZnO, $TiO_2$, $CeO_2$, $Sb_2O_5$, $SnO_2$, $ZrO_2$, $Ta_2O_5$, and the like, and examples of the film with a low refractive index include films of $SiO_2$ and the like.

If necessary, an antifogging coating layer, an antifouling layer, or a water repellent layer may be formed over the antireflection layer. Regarding the method for forming the antifogging coat layer, the antifouling layer, and the water repellent layer, the method, material, and the like used for treating these layers are not particularly limited as long as they do not exert a negative influence on the antireflection function. It is possible to use known methods and materials used for an antifogging coating treatment, an antifouling treatment, and a water repellency treatment. Examples of the methods used for the antifogging coating treatment and the antifouling treatment include a method of covering the surface with a surfactant; a method of giving water absorbing properties to the layer by adding a hydrophilic film to the surface of the layer; a method of improving the water absorbing properties by forming fine concavities and convexities on the surface of the layer; a method of giving water absorbing properties to the layer by utilizing photocatalytic activity; a method of performing a super water repellency processing on the layer to prevent water drops from adhering to the layer; and the like. Examples of the methods used for the water repellency processing include a method of forming a layer having undergone the water repellency processing by vapor-depositing or sputtering a fluorine-containing silane compound or the like; a method of dissolving a fluorine-containing silane compound in a solvent and then coating a layer with the solution so as to form a layer having undergone the water repellency processing; and the like.

The plastic lens using the urethane-molded product of the present embodiment may be used after being dyed with a dye according to the purpose, such that the lens becomes fashionable or obtains photochromic properties. The lens can be dyed by a known dyeing method, but generally, the following method is used.

Generally, the lens is dyed by a method in which an original lens, which has undergone finishing to have a predetermined optical surface, is dipped in a dyeing liquid in which a dye to be used is dissolved or uniformly dispersed (dyeing step), and then the lens is heated if necessary to fix the dye (annealing step after dyeing). The dye used in the dyeing step is not particularly limited as long as it is a known dye, but generally, an oil-soluble dye or a disperse dye is used. The solvent used in the dyeing step is not particularly limited as long as the dye to be used can be dissolved or uniformly dispersed in the solvent. In the dyeing step, if necessary, a surfactant for dispersing the dye in the dyeing liquid or a carrier for accelerating dyeing may be added. During the dyeing step, a dye and a surfactant, which are added if necessary, are dispersed in water or a mixture consisting of water and an organic solvent so as to prepare a dyebath, the optical lens is dipped in the dyebath, and the lens is dyed for a predetermined time at a predetermined temperature. The dyeing temperature and time can be varied according to the intended color concentration. Generally, the lens may be dyed for a few minutes to tens of hours at a temperature equal to or lower than 120° C., and the dye concentration of the dyebath is set to be 0.01% by weight to 10% by weight. Moreover, when the lens is not easily dyed, dyeing may be performed under pressure. The annealing step after dyeing that is performed if necessary is a step of performing heating processing on the dyed original lens. In the heating processing, water remaining on the surface of the original lens, which has been dyed in the dyeing step, is removed by using a solvent or the like, or alternatively, the solvent is air-dried, and then the lens is caused to stay for a predetermined time in a furnace such as an infrared heating furnace in the atmosphere or a resistance heating furnace. In the annealing step after dyeing, color loss of the dyed original lens is prevented (color loss-preventing processing), and water having penetrated inside of the original lens at the time of dyeing is removed.

[Manufacturing Method of Plastic Polarizing Lens]

The manufacturing method of a plastic polarizing lens of the present embodiment includes the following steps.

Step (a): the alcohol (B), the acidic phosphoric acid ester (C), and the benzotriazole-based compound (D) are mixed together, and then the resultant is mixed with at least one kind of the isocyanate (A) which contains aromatic isocyanate and has two or more isocyanato groups at a temperature of equal to or less than 30° C., thereby obtaining the aforementioned polymerizable composition.

Step (b): a polarizing film is fixed in a casting mold for lens casting, in a state in which at least one surface of the polarizing film is separated from the mold.

Step (c): the polymerizable composition of the present embodiment is injected into a space between the polarizing film and the mold.

Step (d): the composition is polymerized and cured by starting the polymerization of the polymerizable composition at a temperature of equal to or less than 30° C., and a layer formed of polyurethane resin is laminated over at least one surface of the polarizing film.

Hereinafter, the respective steps will be described in order. Herein, because the step (a) can be performed in the same manner as in the step (1) of the aforementioned "Manufacturing method of urethane-molded product", the description thereof will not be repeated.

[Step (b)]

A polarizing film formed of thermoplastic polyester or the like is installed in the internal space of the casting mold for lens casting such that at least one of the film surfaces becomes parallel to the inner surface of the mold facing the film surface. A space portion is formed between the polarizing film and the mold. The polarizing film may be shaped beforehand.

[Step (c)]

Thereafter, by a predetermined injection unit, the polymerizable composition for an optical material of the present embodiment is injected into the space portion between the mold and the polarizing film within the internal space of the casting mold for lens casting.

[Step (d)]

Then, the casting mold for lens casting, in which the polymerizable composition for an optical material has been injected and the polarizing film has been fixed, is heated for several hours to tens of hours according to a predetermined temperature program in a heating device such as an oven or in water, thereby performing curing and molding.

Regarding the temperature of the polymerization and curing, the polymerization of the polymerizable composition is started at a temperature of equal to or less than 30° C., and the polymerization and curing are performed for 1 hour to 48 hours at a temperature of 0° C. to 140° C.

After the curing and molding end, the molded product is taken out of the casting mold for lens casting. In this way, it is possible to obtain the plastic polarizing lens of the present embodiment in which the layer formed of polyurethane resin has been laminated over at least one surface of the polarizing film.

After being released from the mold, the plastic polarizing lens of the present embodiment is desirably subjected to annealing processing performed by heating, such that strain resulting from polymerization is relieved.

If necessary, the plastic polarizing lens of the present embodiment is used after a coating layer is provided over one or both surfaces thereof. Examples of the coating layer include a primer layer, a hard coat layer, an antireflection layer, an antifogging coat layer, an antifouling layer, a water repellent layer, and the like, similarly to the plastic spectacle lens.

In some cases, the plastic lenses for spectacles are stored for a relatively long period of time in a packed state. While being stored in this state, the lenses are scratched or deformed by absorbing moisture. Moreover, in the case that the lenses are discolored with time, and due to the difference in the storage period between the lenses, the color of the lens for the left eye becomes different from the color of the lens for the right eye. That is, the quality of the lenses becomes problematic in some cases.

In this case, such problems can be suppressed or improved by known packing technologies (for example, Japanese Unexamined Patent Publication No. 2007-99313, Japanese Unexamined Patent Publication No. 2007-24998, and Japanese Unexamined Patent Publication No. 9-216674).

Specifically, it is possible to use a method in which the lens is stored in a packing material, which is formed of a material having properties (gas barrier properties) inhibiting transmission of oxygen or oxygen and moisture vapor and filled with inert gas, in an air-tight state; a method in which the lens is stored together with a deoxidizer in a packing material, which is formed of a material having properties (gas barrier properties) inhibiting transmission of oxygen or oxygen and moisture vapor, in an air-tight state; a method in which the lens is vacuum sealed; and the like.

As the deoxidizer, known substances can be used. Examples of the deoxidizer include a substance obtained by packing a deoxidizer composition absorbing oxygen with an air-permeable packing material. As the deoxidizer composition, for example, a composition that absorbs oxygen by utilizing an oxidation reaction of a reducing metal can be used. The deoxidizer using such a deoxidizer composition includes a moisture-dependent deoxidizer which needs to be supplied with moisture from the atmosphere so as to remove oxygen and a self-reactive deoxidizer that does not need to be supplied with moisture from the atmosphere. When the self-reactive deoxidizer is also used, it may be enclosed in a packing material together with a desiccant (for example, silica gel). Moreover, a deoxidizer having both the deoxidizing function and drying function may be used (for example, Pharmakeep (KD or KC type) manufactured by MITSUIBISHI GAS CHEMICAL COMPANY, INC.). In addition, a deoxidizer that performs the deoxidizing function in a dry atmosphere without requiring a moisture donator may be used. Examples of the deoxidizer include a deoxidizer having a deoxidizing component formed of a cross-linked polymer having an unsaturated carbon-carbon bond (for example, see Japanese Unexamined Patent Publication No. 11-70331); a deoxidizer mainly composed of a metal that is obtained by causing a transition metal to be supported on a support and activating the transition metal (for example, see Japanese Unexamined Patent Publication No. 8-38883); a deoxidizer mainly composed of activated magnesium that is obtained by causing a magnesium compound to be supported on a support and then reducing the compound (for example, see Japanese Unexamined Patent Publication No. 2001-37457); a deoxidizer that is mainly composed of a liquid hydrocarbon oligomer having an unsaturated group and contains an oxygen-absorbing composition obtained by causing an oxygen absorption-accelerating substance to be supported on a support (for example, see Japanese Unexamined Patent Publication No. 10-113555); and the like. Examples of commercially available products thereof include Pharmakeep (KH type) manufactured by MITSUIBISHI GAS CHEMICAL COMPANY, INC.

Examples of the self-reactive deoxidizer include a deoxidizer obtained by adding a moisture donator to the deoxidizer described in Japanese Examined Patent Publication No. 57-31449 such that moisture necessary for removing oxygen is supplied from the donator.

The packing material can be filled with inert gas or sealed in a manner in which air in the packing material is substituted with inert gas by removing the air in the packing material and then filing the packing material with inert gas, and the opening of the packing material is sealed in this state.

As the inert gas that fills the packing material, nitrogen, argon, helium, neon, and the like can be used. From the viewpoint of economic efficiency, it is preferable to use nitrogen gas.

In order to prevent deterioration such as deformation of lens caused by moisture or to remove the moisture in the air remaining in the packing material, a desiccant (for example, silica gel) may be enclosed in the packing material together with the lens.

Preferable examples of the packing material include a packing material that is formed of at least a material inhibiting transmission of oxygen and contains a metal foil layer such as aluminum having a low oxygen transmission rate.

Second Embodiment

The manufacturing method of a polyurethane-molded product (resin) of the present embodiment includes the following steps (i) to (iii).

Step (i): the alcohol (B) is added to the isocyanate (A) such that a ratio of the hydroxyl groups to the isocyanato groups of the isocyanate (A) falls into a range of 10 mol % to 20 mol %, and the isocyanate (A) is reacted with the alcohol (B) in the presence of the acidic phosphoric acid ester (C), the benzotriazole-based compound (D), and a hindered amine-based compound, thereby obtaining a prepolymer.

Step (ii): at a temperature of equal to or less than 30° C., the following alcohol (B) is further added to the prepolymer, thereby obtaining a polymerizable composition.

Step (iii): the prepolymer and the alcohol (B) contained in the polymerizable composition are polymerized.

In the present embodiment, as the components (A) to (D), the component (E) which will be described later, and other components, the aforementioned components can be used.

[Step (i)]

In the step (i), the alcohol (B) is added to the isocyanate (A) such that a ratio of the hydroxyl groups to the isocyanato groups of the isocyanate (A) falls into a range of 10 mol % to 20 mol %, and the isocyanate (A) is reacted with the alcohol (B), thereby obtaining a prepolymer. The reaction is performed in the presence of the acidic phosphoric acid ester (C), the benzotriazole-based compound (D), and a hindered amine-based compound.

When the reaction is performed by adding only the acidic phosphoric acid ester (C) as a catalyst, the isocyanate (A) reacts with the acidic phosphoric acid ester (C), and consequentially, white solids having low solubility are precipitated in some cases. If the polymerization is performed in this state, the transparency of resin deteriorates, and thus the resin becomes unsuitable for being used for spectacles in some cases.

However, when prepolymerization is performed by adding the hindered amine-based compound at the same time, the reaction between the isocyanate (A) and the acidic phosphoric acid ester (C) is inhibited, and the precipitation of white solids having low solubility is inhibited. Accordingly, in the step (i), it is preferable to perform the reaction in the presence of the isocyanate (A), the alcohol (B) that contains the hydroxyl groups, of which the ratio to the isocyanato groups of the isocyanate (A) is within a range of 10 mol % to 20 mol %, the acidic phosphoric acid ester (C), the benzotriazole-based compound (D), and the hindered amine-based compound.

The reaction temperature is not particularly limited, but the reaction is preferably performed at room temperature (a temperature of equal to or less than 30° C.)

The prepolymer obtained in the step (i) can be in the form of a prepolymer having viscosity of equal to or less than 1,000 mPa·s at 20° C. when the viscosity is within the above range, it is preferable since the prepolymer is easily handled, and the work can be performed at room temperature without a problem.

When the polymerizable composition contains a phenol-based compound, the step (i) can include a step of obtaining a prepolymer by adding the alcohol (B) to the isocyanate (A) such that a ratio of the hydroxyl groups to the isocyanato groups of the isocyanate (A) falls into a range of 10 mol % to 20 mol %, and reacting the isocyanate (A) with the alcohol (B) in the presence of the acidic phosphoric acid ester (C), the benzotriazole-based compound (D), and the phenol-based compound (E).

[Step (ii)]

In the step (ii), at a temperature of equal to or less than 30° C., the alcohol (B) is added to and mixed with the prepolymer obtained in the step (i), thereby obtaining a polymerizable composition. The amount of the alcohol (B) added in the step (ii) is the remainder left when the amount of the alcohol used for the prepolymerization is subtracted from the total amount of the alcohol (B) used for manufacturing the polyurethane resin.

The mixing step in the step (ii) is performed at room temperature (a temperature of equal to or less than 30° C.), and in this way, the occurrence of an injection mark or striae in the obtained molded product can be inhibited, and a rapid increase in the viscosity of the polymerizable composition can also be inhibited. Therefore, the viscosity of the obtained polymerizable composition is equal to or less than 1,000 mPa·s at 20° C., and thus the polymerizable composition can be easily injected into the mold in the following step. Furthermore, if a two fluid blending and ejecting apparatus (dispenser) is used, it is possible to inhibit adherence loss or contamination of the instrument used, and to prevent wiring from being blocked or prevent the instrument such as a pump from breaking down.

The mixing apparatus used in the step (ii) is not particularly limited, and the aforementioned dynamic mixer-type dispenser can be used. The mixer of the dispenser includes a line mixer type which does not have a mixer driving portion for performing stirring and a dynamic mixer type which has a driving portion. From the viewpoint of stirring efficiency of the polymerizable composition of the present embodiment, the dynamic mixer-type dispenser is more preferable.

The dynamic mixer-type dispenser (mixing apparatus) of the present embodiment will be described by using a drawing.

As shown in FIG. 1, a mixing of the present embodiment includes a cylindrical container 12; a shaft 14 that has been inserted into the container 12 from the upper portion of the container 12 along the central axis direction of the container; a stirring blade 16 that is wound in the form of a screw along the outer circumferential surface of the shaft 14; a first supply portion 18 that is disposed in the upper portion of the container 12 and supplies a solution of the prepolymer into the container 12; a second supply portion 20 that is disposed in the upper portion of the container 12 and supplies a solution of the alcohol (B) into the container 12; and an ejection portion 22 that is disposed at the bottom of the container 12.

The container 12 may include a cooler, and can cool the prepolymer and the alcohol (B) supplied into the container 12 to a temperature equal to or less than 30° C. when the prepolymer and the alcohol (B) are mixed together.

The top of the shaft 14 is connected to a mixer driving portion and can be rotated at a predetermined rotation frequency.

The first supply portion 18 includes a supply unit such as a pump or a tank not shown in the drawing, and can supply the prepolymer into the container 12 at a predetermined rate. The second supply portion 20 includes a supply unit such as a pump or a tank not shown in the drawing, and can supply the alcohol (B) into the container 12 at a predetermined rate.

In the present embodiment, examples of the dynamic mixer-type dispenser (mixing apparatus 10) include a two fluid blending and ejecting apparatus (trade name: Super Shot series (manufactured by Nippon Sosey Kogyo corporation)), MAK series (trade name, manufactured by M & K Co., Ltd.), and the like.

When the mixing apparatus 10 shown in FIG. 1 is used, the step (ii) includes the following steps.

Step a: The prepolymer and the alcohol (B) are supplied into the container 12 from the first supply portion 18 and the second supply portion 20 respectively.

Step b: A polymerizable composition is prepared by rotating the shaft 14 such that the prepolymer and the alcohol (B) are moved down while being mixed together at a temperature of equal to or less than 30° C. by the stirring blade 16 which is wound in the form of screw along the outer circumferential surface of the shaft 14, and the obtained polymerizable composition is ejected from the ejection portion 22.

(Step a)

The prepolymer and the alcohol (B) may be supplied into the container 12 in any order without particular limitation. However, it is preferable that these are simultaneously supplied. Moreover, the place from which these are supplied is not particularly limited, and it is preferable for the place to be in a position perpendicular to the blade. Furthermore, if the solution has high viscosity, it is preferable to supply the solution along the shaft since stirring efficiency can be further improved.

(Step b)

The rotation frequency (rotation frequency of the shaft 14) of the mixer of the dispenser is within a range of 1,000 rpm to 4,000 rpm, more preferably within a range of 1,500 rpm to 3,500 rpm, and even more preferably within a range of 2,000 rpm to 3,000 rpm. When the rotation frequency is within the above range, the prepolymer and the alcohol (B) can be uniformly mixed together, and accordingly, it is possible to inhibit irregular streaks from being formed in the obtained molded product as a result of insufficient mixing.

The rate at which the polymerizable composition is ejected from the ejection portion 22 is within a range of 0.5 g/s to 4.0 g/s, preferably within a range of 0.5 g/s to 3.0 g/s, and more preferably within a range of 1.0 g/s to 3.0 g/s. When the rate is within the above range, it is possible to inhibit irregular streaks from being formed in the obtained molded product as a result of insufficient mixing and to control polymerization properties, thereby it is possible to inhibit the occurrence of an injection mark or striae.

When the dynamic mixer-type dispenser is used, it is possible to further reduce the viscosity of the obtained polymerizable composition. Therefore, the use of such a dispenser is more preferable since mass production can be achieved, and the occurrence of an injection mark or striae in the molded product can be effectively inhibited. In the present embodiment, the viscosity of the polymerizable composition obtained in the step b can be reduced to be equal to or less than 500 mPa·s at 20° C.

[Step (iii)]

In the step (iii), by polymerizing the prepolymer and the alcohol (B) contained in the polymerizable composition, polyurethane resin is manufactured. In the present embodiment, a method for obtaining a molded product formed of the polyurethane resin will be described for example.

The polymerizable composition obtained in the present embodiment is injected into a mold (casting mold) held by a gasket, a tape, or the like. The polymerizable composition obtained by the manufacturing method of the present embodiment has viscosity of equal to or less than 1,000 mPa·s, and can be easily handled at room temperature (a temperature of equal to or less than 30° C.). Therefore, casting can be performed at a temperature of equal to or less than 30° C. At this time, depending on the physical properties required for the obtained molded product, if necessary, it is preferable to perform degassing processing under reduced pressure or filtration processing such as pressurization or pressure reduction.

For polymerizing the prepolymer and the alcohol (B) contained in the polymerizable composition, heating is started at a temperature of equal to or less than 30° C., and the polymerizable composition is polymerized by being heated at a temperature that is slowly increased from the aforementioned temperature. When the heating is started at a temperature exceeding 30° C., release properties of the molded product obtained after the polymerization markedly deteriorates, and striae easily occurs in the obtained molded product. For this reason, heating of the polymerizable composition is preferably started at a temperature of equal to or less than 30° C. The polymerization conditions are not limited because the conditions greatly vary with the type of the isocyanate or the alcohol used, the shape of the mold, and the like. However, the polymerization is performed at a temperature of about 0° C. to 140° C. for 1 hour to 48 hours.

If necessary, the molded product formed of the polyurethane resin of the present embodiment may be subjected to processing such as annealing. The processing temperature is generally within a range of 50° C. to 150° C. However, the processing temperature is preferably 90° C. to 140° C., and more preferably 100° C. to 130° C.

If necessary, a plastic lens using the polyurethane-molded product of the present embodiment may be used after a coating layer is provided over one or both surfaces of the lens. Examples of the coating layer include a primer layer, a hard coat layer, an antireflection layer, an antifogging coating layer, an antifouling layer, a water repellent layer, and the like. Each of these coating layers may be used singly, or a plurality of the coating layers may be used in the form of a multi-layer. When the coating layer is provided over both surfaces of the plastic lens, the same coating layer or different coating layers may be provided over the respective surfaces.

Herein, these coating layers in the present embodiment are the same as those in the first embodiment, and accordingly, the description thereof will not be repeated.

The plastic lens using the polyurethane-molded product of the present embodiment may be used after being dyed with a dye according to the purpose, such that the lens becomes fashionable or obtains photochromic properties.

Herein, the dye and the dying method used in the present embodiment are the same as those in the first embodiment, and accordingly, the description thereof will not be repeated.

[Manufacturing Method of Plastic Polarizing Lens]

When a plastic polarizing lens is manufactured by the manufacturing method of a polyurethane resin of the present embodiment, the manufacturing method includes the following step (a) before the step (iii). Furthermore, the step (iii) includes the following steps (b) and (c).

Step (a): a polarizing film is fixed in a casting mold for lens casting, in a state in which at least one surface of the polarizing film is separated from the mold.

Step (b): the polymerizable composition of the present embodiment is injected into a space between the polarizing film and the mold.

Step (c): the polymerizable composition is polymerized and cured, and a layer formed of polyurethane resin is laminated over at least one surface of the polarizing film.

Hereinafter, the respective steps will be described in order.

Step (a)

A polarizing film formed of thermoplastic polyester or the like is installed in the internal space of the casting mold for lens casting such that at least one of the film surfaces becomes parallel to the inner surface of the mold facing the film surface. A space portion is formed between the polarizing film and the mold. The polarizing film may be shaped beforehand.

Step (b)

Thereafter, by a predetermined injection unit, the polymerizable composition of the present embodiment is injected into the space portion between the mold and the polarizing film within the internal space of the casting mold for lens casting.

Step (c)

Then the casting mold for lens casting, into which the polymerizable composition has been injected and the polarizing film has been fixed, is heated for several hours to tens of hours according to a predetermined temperature program in a heating device such as an oven or in water, thereby performing curing and molding.

Regarding the temperature of the polymerization and curing, the heating is preferably started at a temperature of equal to or less than 30° C. The polymerization conditions are not limited, because the conditions greatly vary with the type of the isocyanate or the alcohol used, the shape of the mold, and the like. However, the polymerization is performed at a temperature of about 0° C. to 140° C. for 1 hour to 48 hours.

After the curing and molding end, the molded product is taken out of the casting mold for lens casting. In this way, it is possible to obtain the plastic polarizing lens of the present embodiment in which the layer formed of polyurethane resin has been laminated over at least one surface of the polarizing film.

After being released from the mold, the plastic polarizing lens of the present embodiment is desirably subjected to annealing processing performed by heating, such that strain resulting from polymerization is relieved.

If necessary, the plastic polarizing lens of the present embodiment is used after a coating layer is provided over one or both surfaces thereof. Examples of the coating layer include a primer layer, a hard coat layer, an antireflection layer, an antifogging coat layer, an antifouling layer, a water repellent layer, and the like, similarly to the plastic spectacle lens.

Herein, these coating layers in the present embodiment are the same as those in the first embodiment, and accordingly, the description thereof will not be repeated.

In some cases, the plastic lenses for spectacles are stored for a relatively long period of time in a packed state. While being stored in this state, the lenses are scratched or deformed by absorbing moisture. Moreover, the lenses are discolored, and due to the difference in the storage period between the lenses, the color of the lens for the left eye becomes different from the color of the lens for the right eye. That is, the quality of the lenses becomes problematic in some cases.

In this case, such problems can be suppressed or improved by known packing technologies (for example, Japanese Unexamined Patent Publication No. 2007-99313, Japanese Unexamined Patent Publication No. 2007-24998, and Japanese Unexamined Patent Publication No. 9-216674).

Herein, the packing technologies in the present embodiment are the same as those in the first embodiment, and accordingly, the description thereof will not be repeated.

Hitherto, embodiments of the present invention have been described. However, these are merely examples of the present invention, and the present invention can adopt various constitutions other than the above.

The mixing apparatus shown in FIG. 1 just needs to include the aforementioned respective constituents, and the shape, position of the constituents in the apparatus, and the like are not particularly limited.

EXAMPLES

Hereinafter, the present invention will be more specifically described based on examples.

The ratio of secondary hydroxyl groups to the total molar number of primary and secondary hydroxyl groups contained in the alcohol was calculated by using proton nuclear magnetic resonance spectroscopy, $^1$H-NMR (400 MHz). The measurement conditions were as follows.

Apparatus: ECP-400P (manufactured by JEOL Ltd.), number of times of integration: 16, range of observation: 8,000 Hz An alcohol to be measured was diluted with deuterated chloroform, and then trifluoroacetic anhydride was added to the alcohol and reacted with the alcohol at 20° C. to 25° C. for 1 hour. At this time, the molar number of the trifluoroacetic anhydride added was greater than the molar number of the primary and secondary hydroxyl groups contain in the alcohol. Thereafter, the state in which the reaction had been completed was confirmed. Then, measuring $^1$H-NMR, the ratio of the secondary hydroxyl groups was calculated by the following equation.

$$X=A/(A+B/2)\times100$$

X: the ratio of the secondary hydroxyl groups, A: an integral value of chemical shift of 5.3 ppm to 5.6 ppm, B: an integral value of chemical shift of 4.2 ppm to 4.5 ppm In a performance test for resin, a refractive index, specific gravity, transparency, striae, heat resistance, and a YI value were evaluated by the following method.

Refractive index (ne): A refractive index was measured at 20° C. by using a Pulfrich refractometer.

Transparency: The obtained lens was irradiated with a projector in a dark place, and the occurrence of fogging and opaque substances as well as whether or not an adhesive component was eluted from the tape was determined by visual observation. A lens, in which the occurrence of fogging and opaque substance as well as the elution from the tape were not observed, was evaluated to be "transparent", and a lens in which the above items were observed was evaluated to be "not transparent".

Striae: The light of a high-pressure mercury lamp was projected to the obtained lens. A lens in which strain was not observed was evaluated to be "absent", and a lens in which strain was observed was evaluated to be "present".

Heat resistance: A glass transition temperature Tg was measured by a TMA penetration method (load: 50 g, pin tip: 0.5 mmΦ, rate of temperature increase: 10° C./min).

YI value (light resistance): By using a flat plate having a thickness of 2 mm and an accelerated light resistance tester manufactured by Q-Lab Corporation, a QUV test was performed (light source: UVA-340, intensity: 0.51 W/m$^2$, test condition: 50° C.×48 hrs.), and in this way, the color change (ΔYI) before and after irradiation was measured. The YI value was evaluated based on the following criteria.

A: equal to or less than 1.0
B: greater than 1.0 and equal to or less than 5.0
C: greater than 5.0 and equal to or less than 10.0
D: greater than 10.0

Example 1

58.8 g of a propylene oxide adduct of trimethylolpropane (manufactured by Bayer MaterialScience; Desmophen 4011T) (a ratio of secondary hydroxyl groups determined by the aforementioned measurement method: 70%), 0.6 g of Zelec UN (manufactured by Stepan Company; an acidic phosphoric acid ester), and 0.4 g of TINUVIN 292 (manufactured by BASF Corporation; a light stabilizer) were mixed and dissolved together, thereby obtaining a homogeneous solution. Furthermore, 3.00 g of a benzotriazole-based compound (manufactured by KYODO CHEMICAL CO., LTD.; Biosorb 583 (2-(2'-hydroxy-5'-tert-octylphenyl)benzotriazole)) was mixed with and dissolved in 41.20 g of a mixture of 2,4-tolylene diisocyanate and 2,6-tolylene diisocyanate, thereby obtaining a homogeneous solution. The solutions were mixed together at 20° C., subjected to degassing under 400 Pa, and then injected into a mold. Then the mold was put into a polymerization oven, and polymerization was performed by slowly increasing temperature from 15° C. to 120° C. for 24 hours. After the polymerization ended, the mold was taken out of the oven, and the work of releasing the molded product from the mold was performed. The release properties were excellent, and peeling of the mold was not observed. The obtained molded product was further subjected to annealing processing for 2 hours at 120° C. The obtained molded product was transparent, and striae was not observed in the molded product. The molded product had a refractive index (ne) of 1.54 and Tg of 81° C., and was suitable for being used as an optical material.

Moreover, the value of ΔYI of the molded product was 0.1 which showed excellent light resistance. The evaluation results of the molded product are shown in Table-1.

Figure 2:
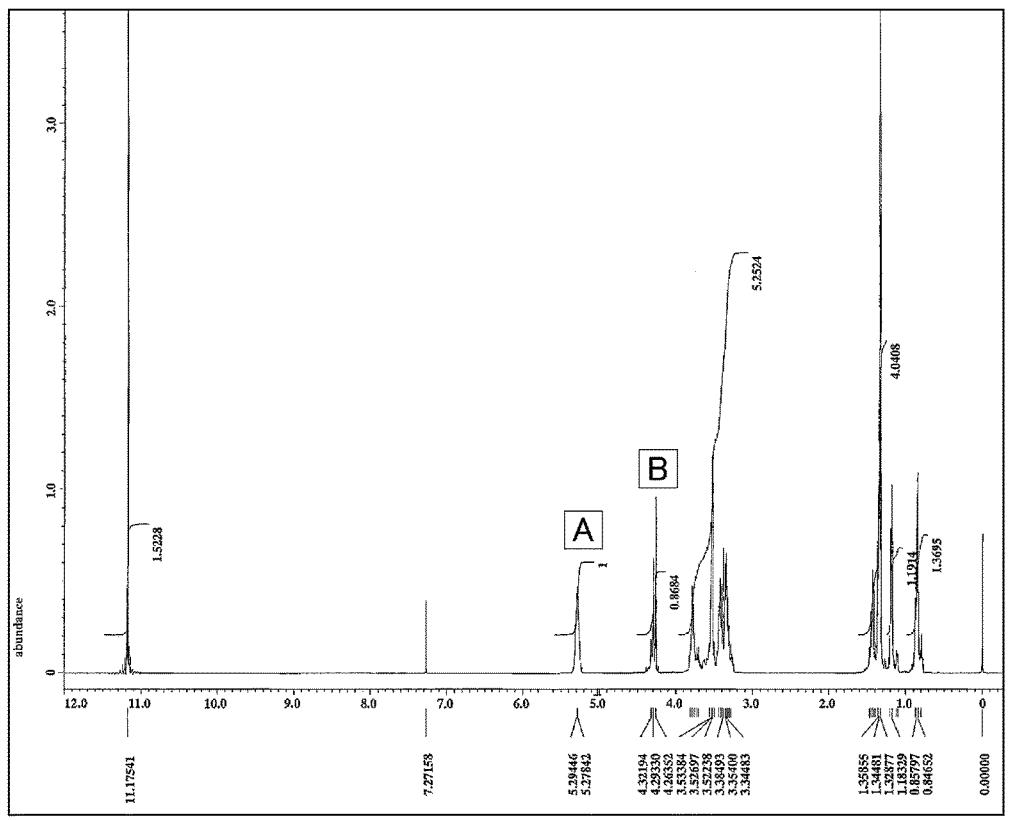
FIG. 2 is a $^1$H-NMR measurement chart of a propylene oxide adduct of trimethylolpropane.

FIG. 2 shows a $^1$H-NMR measurement chart of the propylene oxide adduct of trimethylolpropane. In FIG. 2, "A" indicates a peak of chemical shift of 5.3 ppm to 5.6 ppm, and "B" indicates a peak of chemical shift of 4.2 ppm to 4.5 ppm.

Example 2

56.22 g of a propylene oxide adduct of trimethylolpropane (manufactured by Bayer MaterialScience; Desmophen 4011T) (a ratio of secondary hydroxyl groups determined by the aforementioned measurement method: 70%), 0.6 g of Zelec UN (manufactured by Stepan Company; an acidic phosphoric acid ester), and 0.4 g of TINUVIN 292 (manufactured by BASF Corporation; a light stabilizer) were mixed and dissolved together, thereby obtaining a homogeneous solution. Furthermore, 1.00 g of a benzotriazole-based compound (manufactured by KYODO CHEMICAL CO., LTD.; Biosorb 583) was mixed with and dissolved in 43.78 g of a mixture of 2, 4-tolylene diisocyanate and 2, 6-tolylene diisocyanate, thereby obtaining a homogeneous solution. The solutions were mixed together at 20° C., subjected to degassing under 400 Pa, and then injected into a mold. Then the mold was put into a polymerization oven, and polymerization was performed by slowly increasing temperature from 15° C. to 120° C. for 24 hours. After the polymerization ended, the mold was taken out of the oven, and the work of releasing the molded product from the mold was performed. The release properties were excellent, and peeling of the mold was not observed. The obtained molded product was further subjected to annealing processing for 2 hours at 120° C. The obtained molded product was transparent, and stria was not observed in the molded product. The molded product had a refractive index (ne) of 1.54 and Tg of 105° C., and was suitable for being used as an optical material. The evaluation results of the molded product are shown in Table-1.

Example 3

A molded product was obtained by the same procedure as in Example 2, except that the amount of the benzotriazole-based compound (manufactured by KYODO CHEMICAL CO., LTD.; Biosorb 583) added was changed to 3.00 g. The evaluation results of the molded product are shown in Table-1.

Example 4

A molded product was obtained by the same procedure as in Example 2, except that the amount of the benzotriazole-based compound (manufactured by KYODO CHEMICAL CO., LTD.; Biosorb 583) added was changed to 10.00 g. The evaluation results of the molded product are shown in Table-1.

Example 5

A molded product was obtained by the same procedure as in Example 2, except that 50.75 g of a propylene oxide adduct of glycerol (manufactured by Mitsui Chemicals, Inc.; Actcol T250) (a ratio of secondary hydroxyl groups determined by the aforementioned measurement method: 880), 0.6 g of Zelec UN (manufactured by Stepan Company; an acidic phosphoric acid ester), and 0.4 g of TINUVIN 292 (manufactured by BASF Corporation; a light stabilizer) were mixed and dissolved together to obtain a homogeneous solution, and the amount of the mixture of 2,4-tolylene diisocyanate and 2,6-tolylene diisocyanate mixed in was changed to 49.25 g. The evaluation results of the molded product are shown in Table-1.

Example 6

A molded product was obtained by the same procedure as in Example 5, except that the amount of the benzotriazole-based compound (manufactured by KYODO CHEMICAL CO., LTD.; Biosorb 583) added was changed to 3.00 g. The evaluation results of the molded product are shown in Table-1.

Example 7

A molded product was obtained by the same procedure as in Example 5, except that the amount of the benzotriazole-based compound (manufactured by KYODO CHEMICAL CO., LTD.; Biosorb 583) added was changed to 10.00 g. The evaluation results of the molded product are shown in Table-1.

Example 8

A molded product was obtained by the same procedure as in Example 2, except that the amount of the propylene oxide adduct of trimethylolpropane was changed to 53.94 g, and the amount of the mixture of 2,4-tolylene diisocyanate and 2,6-tolylene diisocyanate was changed to 46.06 g. The evaluation results of the molded product are shown in Table-1.

Example 9

A molded product was obtained by the same procedure as in Example 8, except that the amount of the benzotriazole-based compound (manufactured by KYODO CHEMICAL CO., LTD.; Biosorb 583) added was changed to 3.00 g. The evaluation results of the molded product are shown in Table-1.

Example 10

A molded product was obtained by the same procedure as in Example 8, except that the amount of the benzotriazole-based compound (manufactured by KYODO CHEMICAL CO., LTD.; Biosorb 583) added was changed to 10.00 g. The evaluation results of the molded product are shown in Table-1.

Example 11

A molded product was obtained by the same procedure as in Example 9, except that 1.5 g of 2,6-di-tert-butyl-p-cresol was added. The evaluation results of the molded product are shown in Table-1.

Example 12

A molded product was obtained by the same procedure as in Example 10, except that 1.5 g of 2,6-di-tert-butyl-p-cresol was added. The evaluation results of the molded product are shown in Table-1.

Example 13

A molded product was obtained by the same procedure as in Example 2, except that the amount of the propylene oxide adduct of glycerol was changed to 48.37 g, and the amount of the mixture of 2,4-tolylene diisocyanate and 2,6-tolyene diisocyanate was changed to 51.63 g. The evaluation results of the molded product are shown in Table-1.

Example 14

A molded product was obtained by the same procedure as in Example 13, except that the amount of the benzotriazole-based compound (manufactured by KYODO CHEMICAL CO., LTD.; Biosorb 583) added was changed to 3.00 g. The evaluation results of the molded product are shown in Table-1.

Example 15

A molded product was obtained by the same procedure as in Example 13, except that the amount of the benzotriazole-based compound (manufactured by KYODO CHEMICAL CO., LTD.; Biosorb 583) added was changed to 10.00 g. The evaluation results of the molded product are shown in Table-1.

Example 16

A molded product was obtained by the same procedure as in Example 14, except that 1.5 g of 2,6-di-tert-butyl-p-cresol was added. The evaluation results of the molded product are shown in Table-1.

Example 17

A molded product was obtained by the same procedure as in Example 16, except that the amount of the benzotriazole-based compound (manufactured by KYODO CHEMICAL CO., LTD.; Biosorb 583) added was changed to 10.00 g. The evaluation results of the molded product are shown in Table-1.

Example 18

A molded product was obtained by the same procedure as in Example 1, except that the amount of the mixture of 2,4-tolyene diisocyanate and 2,6-tolylene diisocyanate was changed to 48.25 g, and the amount of the propane propylene oxide adduct of trimethylol was changed to 51.75 g. The evaluation results of the molded product are shown in Table-1.

Example 19

3.0 g of benzotriazole-based compound (manufactured by KYODO CHEMICAL CO., LTD.; Biosorb 583), 0.6 g of Zelec UN (manufactured by STEPAN Company; an acidic phosphoric acid ester), and 0.40 g of TINUVIN 292 (manufactured by BASF Corporation; a hindered amine-based compound) were mixed with and dissolved in 46.06 g of a mixture of 2,4-tolylene diisocyanate and 2,6-tolylene diisocyanate, thereby obtaining a homogeneous solution. After the solution was held at 20° C., 8.09 g of a propylene oxide adduct of trimethylolpropane (manufactured by Bayer MaterialScience; Desmophen 4011T) (a ratio of secondary hydroxyl groups determined by the aforementioned measurement method: 70%) was added to the solution, and the resultant was reacted for 3 hours at 20° C. (step (i)). It was confirmed that the viscosity at 20° C. of the obtained prepolymer was 100 mPa·s, and the prepolymer had no problem with work. Subsequently, after being held at 20° C., the prepolymer was homogeneously mixed with 45.85 g of a propylene oxide adduct of trimethylolpropane (manufactured by Bayer MaterialScience; Desmophen 4011T) at 20° C. by using a stirrer bar (step (ii)). It was confirmed that the viscosity at 20° C. of the obtained polymerizable composition was 400 mPa·s, and the composition had no problem with work. Thereafter, the polymerizable composition was injected into a cavity having a space with a thickness of 2 mm formed between two sheets of flat glass plates facing each other that are referred to as "mold", put into a polymerization oven, and polymerized by slowly increasing temperature from 30° C. to 130° C. for 24 hours (step (iii)). After the polymerization ended, the mold was taken out of the oven, and the work of releasing the molded product from the mold was performed. The release properties were excellent, and peeling of the mold was not observed. The obtained molded product was further subjected to annealing processing for 2 hours at 120° C. The obtained molded product was transparent, and striae was not observed in the molded product. The molded product had a refractive index (ne) of 1.55 and Tg of 103° C., and was suitable for being used as an optical material.

The value of ΔYI of the resin that was determined by a QUV irradiation test was 3.5 which showed excellent light resistance. The results are shown in Table-1.

Example 20

A molded product was obtained by the same procedure as in Example 9, except that 2.0 g of 2,6-di-tert-butyl-p-cresol was added. The evaluation results of the molded product are shown in Table-1.

Example 21

A polymerizable composition was blended by the same method as in Example 19, except that the mixing in the step (ii) was performed at 30° C. by using Super Shot series (trade name) as a two fluid blending and ejecting apparatus manufactured by Nippon Sosey Kogyo corporation). The rotation frequency of the mixer was 2,500 rpm, and the ejection rate was 1.0 g/s. It was confirmed that the viscosity at 20° C. of the obtained polymerizable composition was 300 mPa·s, and the composition had no problem with work. The polymerizable composition was injected into a cavity having a space with a thickness of 2 mm formed between two sheets of flat glass plates facing each other that are referred to as "mold", put into a polymerization oven, and polymerized by slowly increasing temperature from 30° C. to 130° C. for 24 hours. After the polymerization ended, the mold was taken out of the oven, and the work of releasing the molded product from the mold was performed. The release properties were excellent, and peeling of the mold was not observed. The obtained molded product was further subjected to annealing processing for 2 hours at 120° C. The obtained molded product was transparent, and striae was not observed in the molded product. The molded product had a refractive index (ne) of 1.55 and Tg of 101° C., and was suitable for being used as an optical material.

The value of ΔYI of the resin that was determined by a QUV irradiation test was 3.5 which showed excellent light resistance. The results are shown in Table-1.

Comparative Example 1

A molded product was obtained by the same procedure as in Example 1, except that the benzotriazole-based compound was not added. The value of ΔYI of the molded product was 7.5 which showed that the light resistance thereof was poor. The evaluation results of the molded product are shown in Table-1.

Comparative Example 2

A molded product was obtained by the same procedure as in Example 8, except that the benzotriazole-based compound was not added. The evaluation results of the molded product are shown in Table-1.

Comparative Example 3

A molded product was obtained by the same procedure as in Example 13, except that the benzotriazole-based compound was not added. The evaluation results of the molded product are shown in Table-1.

Comparative Example 4

A molded product was obtained by the same procedure as in Example 18, except that the benzotriazole-based compound was not added. The evaluation results of the molded product are shown in Table-1.

Comparative Example 5

A molded product was obtained by the same procedure as in Example 8, except that the amount of the benzotriazole-based compound (manufactured by KYODO CHEMICAL CO., LTD.; Biosorb 583) was changed to 12.00 g. The molded product was not transparent. Furthermore, because precipitates and the like were observed in the molded product, the refractive index and the like could not be measured.

Comparative Example 6

A molded product was obtained by the same procedure as in Example 18, except that the amount of the benzotriazole-based compound (manufactured by KYODO CHEMICAL CO., LTD.; Biosorb 583) was changed to 12.00 g. The molded product was not transparent. Furthermore, because precipitates and the like were observed in the molded product, the refractive index and the like could not be measured.

Comparative Example 7

A molded product was obtained by the same procedure as in Example 13, except that the amount of the benzotriazole-based compound (manufactured by KYODO CHEMICAL CO., LTD.; Biosorb 583) was changed to 12.00 g. The molded product was not transparent. Furthermore, because precipitates and the like were observed in the molded product, the refractive index and the like could not be measured.

Comparative Example 8

A molded product was obtained by the same procedure as in Example 8, except that the benzotriazole-based compound was replaced with 2,2',4,4'-tetrahydroxybenzophenone. The molded product was not transparent. Furthermore, because precipitates and the like were observed in the molded product, the refractive index and the like could not be measured.

Comparative Example 9

A molded product was obtained by the same procedure as in Example 9, except that the benzotriazole-based compound was replaced with 2,2',4,4'-tetrahydroxybenzophenone. The molded product was not transparent. Furthermore, because precipitates and the like were observed in the molded product, the refractive index and the like could not be measured.

Comparative Example 10

A molded product was obtained by the same procedure as in Example 13, except that the benzotriazole-based compound was replaced with 2,2',4,4'-tetrahydroxybenzophenone. The molded product was not transparent. Furthermore, because precipitates and the like were observed in the molded product, the refractive index and the like could not be measured.

Comparative Example 11

A molded product was obtained by the same procedure as in Example 14, except that the benzotriazole-based compound was replaced with 2,2',4,4'-tetrahydroxybenzophenone. The molded product was not transparent. Furthermore, because precipitates and the like were observed in the molded product, the refractive index and the like could not be measured.

Comparative Example 12

A molded product was obtained by the same procedure as in Example 8, except that the benzotriazole-based compound was replaced with 4-methoxycinnamic acid-2-ethylhexyl. The light resistance of the molded product was poor. The evaluation results of the molded product are shown in Table-1.

Comparative Example 13

A molded product was obtained by the same procedure as in Example 9, except that the benzotriazole-based compound was replaced with 4-methoxycinnamic acid-2-ethylhexyl. The light resistance of the molded product was poor. The evaluation results of the molded product are shown in Table-1.

Comparative Example 14

A molded product was obtained by the same procedure as in Example 13, except that the benzotriazole-based compound was replaced with 4-methoxycinnamic acid-2-ethylhexyl. The light resistance of the molded product was poor. The evaluation results of the molded product are shown in Table-1.

Comparative Example 15

A molded product was obtained by the same procedure as in Example 14, except that the benzotriazole-based compound was replaced with 4-methoxycinnamic acid-2-ethylhexyl. The light resistance of the molded product was poor. The evaluation results of the molded product are shown in Table-1.

Comparative Example 16

A molded product was obtained by the same procedure as in Example 9, except that 6.0 g of 4-methoxycinnamic acid-2-ethylhexyl was added instead of 3.0 g of the benzotriazole-based compound. The molded product was not transparent. Furthermore, because precipitates and the like were observed in the molded product, the refractive index and the like could not be measured.

TABLE 1

| | Isocyanate (A) | Alcohol (B) | | Benzotriazole-based compound (D) | | Phenol-based compound (E) | | Other compounds | |
|---|---|---|---|---|---|---|---|---|---|
| | Molar ratio *1 | | Ratio of secondary hydroxyl group (%) | | Part by weight *2 | | Part by weight *2 | | Part by weight *2 |
| Example 1 | i-1 | 0.90 | ii-1 | 70 | iii-1 | 3.0 | — | — | — | — |
| Example 2 | i-1 | 1.00 | ii-1 | 70 | iii-1 | 1.0 | — | — | — | — |
| Example 3 | i-1 | 1.00 | ii-1 | 70 | iii-1 | 3.0 | — | — | — | — |
| Example 4 | i-1 | 1.00 | ii-1 | 70 | iii-1 | 10.0 | — | — | — | — |
| Example 5 | i-1 | 1.00 | ii-2 | 88 | iii-1 | 1.0 | — | — | — | — |
| Example 6 | i-1 | 1.00 | ii-2 | 88 | iii-1 | 3.0 | — | — | — | — |
| Example 7 | i-1 | 1.00 | ii-2 | 88 | iii-1 | 10.0 | — | — | — | — |
| Example 8 | i-1 | 1.10 | ii-1 | 70 | iii-1 | 1.0 | — | — | — | — |
| Example 9 | i-1 | 1.10 | ii-1 | 70 | iii-1 | 3.0 | — | — | — | — |
| Example 10 | i-1 | 1.10 | ii-1 | 70 | iii-1 | 10.0 | — | — | — | — |
| Example 11 | i-1 | 1.10 | ii-1 | 70 | iii-1 | 3.0 | iv-1 | 1.5 | — | — |
| Example 12 | i-1 | 1.10 | ii-1 | 70 | iii-1 | 10.0 | iv-1 | 1.5 | — | — |
| Example 13 | i-1 | 1.10 | ii-2 | 88 | iii-1 | 1.0 | — | — | — | — |
| Example 14 | i-1 | 1.10 | ii-2 | 88 | iii-1 | 3.0 | — | — | — | — |
| Example 15 | i-1 | 1.10 | ii-2 | 88 | iii-1 | 10.0 | — | — | — | — |
| Example 16 | i-1 | 1.10 | ii-2 | 88 | iii-1 | 3.0 | iv-1 | 1.5 | — | — |
| Example 17 | i-1 | 1.10 | ii-2 | 88 | iii-1 | 10.0 | iv-1 | 1.5 | — | — |
| Example 18 | i-1 | 1.20 | ii-1 | 70 | iii-1 | 3.0 | — | — | — | — |
| Example 19 | i-1 | 1.10 | ii-1 | 70 | iii-1 | 3.0 | — | — | — | — |
| Example 20 | i-1 | 1.10 | ii-1 | 70 | iii-1 | 3.0 | iv-1 | 2.0 | — | — |
| Example 21 | i-1 | 1.10 | ii-1 | 70 | iii-1 | 3.0 | | | — | — |
| Comparative example 1 | i-1 | 0.90 | ii-1 | 70 | — | — | — | — | — | — |
| Comparative example 2 | i-1 | 1.10 | ii-1 | 70 | — | — | — | — | — | — |
| Comparative example 3 | i-1 | 1.10 | ii-2 | 88 | — | — | — | — | — | — |
| Comparative example 4 | i-1 | 1.20 | ii-1 | 70 | — | — | — | — | — | — |
| Comparative example 5 | i-1 | 1.10 | ii-1 | 70 | iii-1 | 12.0 | — | — | — | — |
| Comparative example 6 | i-1 | 1.20 | ii-1 | 70 | iii-1 | 12.0 | — | — | — | — |
| Comparative example 7 | i-1 | 1.10 | ii-2 | 88 | iii-1 | 12.0 | — | — | — | — |
| Comparative example 8 | i-1 | 1.10 | ii-1 | 70 | — | — | — | — | iii-2 | 1.0 |
| Comparative example 9 | i-1 | 1.10 | ii-1 | 70 | — | — | — | — | iii-2 | 3.0 |
| Comparative example 10 | i-1 | 1.10 | ii-2 | 88 | — | — | — | — | iii-2 | 1.0 |
| Comparative example 11 | i-1 | 1.10 | ii-2 | 88 | — | — | — | — | iii-2 | 3.0 |
| Comparative example 12 | i-1 | 1.10 | ii-1 | 70 | — | — | — | — | iii-3 | 1.0 |
| Comparative example 13 | i-1 | 1.10 | ii-1 | 70 | — | — | — | — | iii-3 | 3.0 |
| Comparative example 14 | i-1 | 1.10 | ii-2 | 88 | — | — | — | — | iii-3 | 1.0 |
| Comparative example 15 | i-1 | 1.10 | ii-2 | 88 | — | — | — | — | iii-3 | 3.0 |
| Comparative example 16 | i-1 | 1.10 | ii-1 | 70 | — | — | — | — | iii-3 | 6.0 |

| | Optical properties Refractive index (ne) | Striae | Heat resistance Tg (° C.) | Transparency Determination | light resistance QUV test ΔYI | Determination |
|---|---|---|---|---|---|---|
| Example 1 | 1.54 | Absent | 81 | Transparent | 0.1 | A |
| Example 2 | 1.54 | Absent | 105 | Transparent | 1.1 | B |
| Example 3 | 1.54 | Absent | 102 | Transparent | 0.5 | A |
| Example 4 | 1.55 | Absent | 95 | Transparent | 0.3 | A |
| Example 5 | 1.55 | Absent | 110 | Transparent | 0.6 | A |

TABLE 1-continued

| | | | | | | |
|---|---|---|---|---|---|---|
| Example 6 | 1.55 | Absent | 108 | Transparent | 0.2 | A |
| Example 7 | 1.56 | Absent | 100 | Transparent | 0.2 | A |
| Example 8 | 1.55 | Absent | 107 | Transparent | 2.3 | B |
| Example 9 | 1.55 | Absent | 103 | Transparent | 3.6 | B |
| Example 10 | 1.56 | Absent | 94 | Transparent | 0.6 | A |
| Example 11 | 1.55 | Absent | 101 | Transparent | 0.5 | A |
| Example 12 | 1.56 | Absent | 92 | Transparent | 0.3 | A |
| Example 13 | 1.56 | Absent | 111 | Transparent | 0.2 | A |
| Example 14 | 1.56 | Absent | 110 | Transparent | 1.4 | B |
| Example 15 | 1.57 | Absent | 102 | Transparent | 0.8 | A |
| Example 16 | 1.56 | Absent | 108 | Transparent | 0.9 | A |
| Example 17 | 1.57 | Absent | 101 | Transparent | 0.7 | A |
| Example 18 | 1.55 | Absent | 99 | Transparent | 1.1 | B |
| Example 19 | 1.55 | Absent | 103 | Transparent | 3.5 | B |
| Example 20 | 1.55 | Absent | 101 | Transparent | 0.5 | A |
| Example 21 | 1.55 | Absent | 101 | Transparent | 3.5 | B |
| Comparative example 1 | 1.54 | Absent | 84 | Transparent | 7.5 | C |
| Comparative example 2 | 1.55 | Absent | 112 | Transparent | 12.2 | D |
| Comparative example 3 | 1.55 | Absent | 114 | Transparent | 15.6 | D |
| Comparative example 4 | 1.55 | Absent | 103 | Transparent | 18.8 | D |
| Comparative example 5 | Unmeasurable | Indeterminable | — | Not transparent | — | Indeterminable |
| Comparative example 6 | Unmeasurable | Indeterminable | — | Not transparent | — | Indeterminable |
| Comparative example 7 | Unmeasurable | Indeterminable | — | Not transparent | — | Indeterminable |
| Comparative example 8 | Unmeasurable | Indeterminable | — | Not transparent | — | Indeterminable |
| Comparative example 9 | Unmeasurable | Indeterminable | — | Not transparent | — | Indeterminable |
| Comparative example 10 | Unmeasurable | Indeterminable | — | Not transparent | — | Indeterminable |
| Comparative example 11 | Unmeasurable | Indeterminable | — | Not transparent | — | Indeterminable |
| Comparative example 12 | 1.55 | Absent | 108 | Transparent | 9.6 | C |
| Comparative example 13 | 1.55 | Absent | 107 | Transparent | 17.1 | D |
| Comparative example 14 | 1.55 | Absent | 110 | Transparent | 17.3 | D |
| Comparative example 15 | 1.55 | Absent | 108 | Transparent | 14.8 | D |
| Comparative example 16 | Unmeasurable | Indeterminable | — | Not transparent | — | Indeterminable |

*1: the molar ratio of the isocyanato groups of the isocyanate (A) to the hydroxyl groups of the alcohol (B)
*2: the amount with respect to a total of 100 parts by weight of the isocyanate (A) and the alcohol (B) (part by weight)
i-1: a mixture of 2,4-tolylene diisocyanate and 2,6-tolylene diisocyanate
ii-1: a propylene oxide adduct of trimethylolpropane (manufactured by Bayer MaterialScience; Desmophen 4011T)
ii-2: a propylene oxide adduct of glycerol (manufactured by Mitsui Chemicals, Inc.; Actcol T250)
iii-1: 2-(2-hydroxy-5-tert-octylphenyl)-2H-benzotriazole
iii-2: 2,2',4,4'-tetrahydroxybenzophenone
iii-3: 4-methoxycinnamic acid-2-ethylhexyl
iv-1: 2,6-di-tert-butyl-p-cresol From the results of examples and comparative examples, it was understood that if the polymerizable composition contains the benzotriazole-based compound (D) in a predetermined amount, it is possible to obtain a molded product in which the light resistance, optical properties, heat resistance, and the like are balanced well. Moreover, from the results of Examples 10 and 11, it was understood that if the polymerizable composition contains the phenol-based compound (E) in a predetermined amount, even when the amount of the benzotriazole-based compound (D) added is small, the effect of improving the light resistance becomes excellent.

The urethane molded product obtained from the polymerizable composition for an optical material of the present invention can be suitably used in various optical materials that are required to have a high degree of transparency, particularly, in spectacle lenses.

The present application claims priorities based on Japanese Patent Application No. 2013-063478 filed on Mar. 26, 2013, Japanese Patent Application No. 2013-121627 filed on Jun. 10, 2013, International Patent Application No. PCT/JP2013/079790 filed on Nov. 1, 2013, and International Patent Application No. PCT/JP2013/079791 filed on Nov. 1, 2013, and the entire disclosure of which is incorporated herein.

The present invention can adopt the following embodiments.

[a1] A polymerizable composition for an optical material, including (A) at least one kind of isocyanate having two or more isocyanato groups, which contains aromatic isocyanate, (B) at least one kind of alcohol having two or more hydroxyl groups, and (C) an acidic phosphoric acid ester represented by the following Formula (1), in which a ratio of secondary hydroxyl groups to the total molar number of primary and secondary hydroxyl groups contained in the alcohol (B) is equal to or greater than 50%,

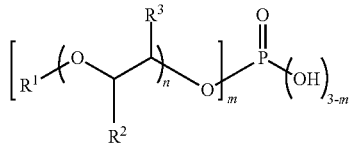

(1)

wherein, in the formula, m represents an integer of 1 or 2, n represents an integer of 0 to 18, $R^1$ represents an alkyl group having 1 to 20 carbon atoms, and each of $R^2$ and $R^3$ independently represents a hydrogen atom, a methyl group, or an ethyl group.

[a2] The polymerizable composition for an optical material described in [a1], in which the alcohol (B) contains at least one kind of compound selected from among glycerol, diglycerol, trimethylolpropane, pentaerythritol, di(trimethylolpropane), an ethylene oxide adduct of glycerol, an ethylene oxide adduct of trimethylolpropane, an ethylene oxide adduct of pentaerythritol, a propylene oxide adduct of glycerol, a propylene oxide adduct of trimethylolpropane, and a propylene oxide adduct of pentaerythritol.

[a3] The polymerizable composition for an optical material described in [a1] or [a2], in which the alcohol (B) contains at least one kind of compound selected from among a propylene oxide adduct of glycerol, a propylene oxide adduct of trimethylolpropane, and a propylene oxide adduct of pentaerythritol.

[a4] The polymerizable composition for an optical material described in any one of [a1] to [a3], in which the aromatic isocyanate is 2,4-tolylene diisocyanate or a mixture of 2,4-tolylene diisocyanate and 2,6-tolylene diisocyanate.

[a5] The polymerizable composition for an optical material described in any one of [a1] to [a4], in the acidic phosphoric acid ester (C) is contained in an amount of 0.1 parts by weight to 3.0 parts by weight with respect to a total of 100 parts by weight of the isocyanate (A) and the alcohol (B).

[a6] The polymerizable composition for an optical material described in any one of [a1] to [a5], further including a hindered amine-based compound, in which the hindered amine-based compound is contained in an amount of 0.1 parts by weight to 2.0 parts by weight with respect to a total of 100 parts by weight of the isocyanate (A) and the alcohol (B).

[a7] A molded product obtained from the polymerizable composition for an optical material described in any one of [a1] to [a6].

[a8] An optical material comprised of the molded product described in [a7].

[a9] A plastic lens comprised of the optical material described in [a8].

The present invention can also adopt the following embodiments.

[b1] A polymerizable composition for an optical material including (A) at least one kind of isocyanate having two or more isocyanato groups, which contains aromatic isocyanate, (B) at least one kind of alcohol having two or more hydroxyl groups, and (C) an acidic phosphoric acid ester represented by the following Formula (1), in which a ratio of secondary hydroxyl groups to the total molar number of primary and secondary hydroxyl groups contained in the alcohol (B) is equal to or greater than 50%,

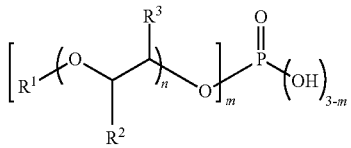

(1)

wherein, in the formula, m represents an integer of 1 or 2, n represents an integer of 0 to 18, $R^1$ represents an alkyl group having 1 to 20 carbon atoms, and each of $R^2$ and $R^3$ independently represents a hydrogen atom, a methyl group, or an ethyl group.

[b2] The polymerizable composition for an optical material described in [b1], in which the alcohol (B) contains at least one kind of compound selected from among glycerol, diglycerol, trimethylolpropane, pentaerythritol, di(trimethylolpropane), an ethylene oxide adduct of glycerol, an ethylene oxide adduct of trimethylolpropane, an ethylene oxide adduct of pentaerythritol, a propylene oxide adduct of glycerol, a propylene oxide adduct of trimethylolpropane, and a propylene oxide adduct of pentaerythritol.

[b3] The polymerizable composition for an optical material described in [b1] or [b2], in which the alcohol (B) contains at least one kind of compound selected from among a propylene oxide adduct of glycerol, a propylene oxide adduct of trimethylolpropane, and a propylene oxide adduct of pentaerythritol.

[b4] The polymerizable composition for an optical material described in any one of [b1] to [b3], in which the aromatic isocyanate 2,4-tolylene diisocyanate or a mixture of 2,4-tolylene diisocyanate and 2,6-tolylene diisocyanate.

[b5] The polymerizable composition for an optical material described in any one of [b1] to [b4], in which the acidic phosphoric acid ester (C) is contained in an amount of 0.1 parts by weight to 3.0 parts by weight with respect to a total of 100 parts by weight of the isocyanate (A) and the alcohol (B).

[b6] The polymerizable composition for an optical material described in any one of [b1] to [b5], further including a hindered amine-based compound, in which the hindered amine-based compound is contained in an amount of 0.1 parts by weight to 2.0 parts by weight with respect to a total of 100 parts by weight of the isocyanate (A) and the alcohol (B).

[b7] A manufacturing method of a molded product, including a step of obtaining the polymerizable composition described in any one of [b1] to [b6] by mixing the alcohol (B) and the acidic phosphoric acid ester (C) together, and then mixing the resultant with at least one kind of the isocyanate (A), which contains aromatic isocyanate and two or more isocyanato groups, at a temperature of equal to or less than 30° C., a step of casting the polymerizable composition into a casting mold, and a step of polymerizing the composition by starting polymerization of the polymerizable composition at a temperature of equal to or less than 30° C.

[b8] A molded product obtained from the polymerizable composition for an optical material described in any one of [b1] to [b7].

[b9] An optical material comprised of the molded product described in [b8].

[b10] A plastic lens comprised of the optical material described in [b9].

[b11] A manufacturing method of a plastic polarizing lens, including a step of obtaining the polymerizable composition for an optical material described in any one of [b1] to [b6]

by mixing the alcohol (B) and the acidic phosphoric acid ester (C) together and then mixing the resultant with at least one kind of the isocyanate (A), which contains aromatic isocyanate and has two or more isocyanato groups, at a temperature of equal to or less than 30° C., a step of fixing a polarizing film in a casting mold for lens casting in a state in which at least one surface of the polarizing film is separated from the mold, a step of injecting the polymerizable composition into a space between the polarizing film and the mold, and a step of laminating a layer comprised of polyurethane resin over at least one surface of the polarizing film by polymerizing and curing the polymerizable composition by starting the polymerization of the polymerizable composition at a temperature of equal to or less than 30° C.

[b12] A plastic polarizing lens obtained by the manufacturing method described in [b11].

The present invention can also adopt the following embodiments.

[c1] A manufacturing method of polyurethane resin, including a step (i) of obtaining a prepolymer by adding alcohol (B) to isocyanate (A) such that a ratio of hydroxyl groups to isocyanato groups of the isocyanate (A) falls into a range of 10 mol % to 20 mol %, and reacting the isocyanate (A) with the alcohol (B) in the presence of an acidic phosphoric acid ester (C) and a hindered amine-based compound (D), a step (ii) of obtaining a polymerizable composition by adding the alcohol (B) to the prepolymer and mixing the alcohol (B) and the prepolymer together at a temperature of equal to or less than 30° C., and a step (iii) of polymerizing the prepolymer and the alcohol (B) contained in the polymerizable composition, in which the isocyanate (A) is at least one kind of isocyanate having two or more isocyanato groups, which contains aromatic isocyanate, the alcohol (B) is at least one kind of alcohol having two or more hydroxyl groups, and a ratio of secondary hydroxyl groups to the total molar number of primary and secondary hydroxyl groups contained in the alcohol (B) is equal to or greater than 50 mol %.

[c2] The manufacturing method described in [c1], in which the reaction temperature in the step (i) is equal to or less than 30° C.

[c3] The manufacturing method described in [c1] or [c2], in which in the step (iii), heating is started at a temperature of equal to or less than 30° C. when the prepolymer and the alcohol (B) are polymerized.

[c4] The manufacturing method described in any one of [c1] to [c3], in which the viscosity of the prepolymer and the polymerizable composition is equal to or less than 1,000 mPa·s at 20° C.

[c5] The manufacturing method described in any one of [c1] to [c4], in which the step (ii) is performed by a mixing apparatus including a cylindrical container, a shaft that has been inserted into the container from the upper portion of the container along the central axis direction of the container, a stirring blade that is wound in the form of a screw along the outer circumferential surface of the shaft, a first supply portion that is disposed in the upper portion of the container and supplies a solution of the prepolymer into the container, a second supply portion that is disposed in the upper portion of the container and supplies a solution of the alcohol (B) into the container, and an ejection portion that is disposed at the bottom of the container, and includes a step of supplying the prepolymer and the alcohol (B) into the container from the first supply portion and the second supply portion respectively and a step of preparing the polymerizable composition by rotating the shaft such that the prepolymer and the alcohol (B) are moved down while being mixed together at a temperature of equal to or less than 30° C. by the stirring blade, which is wound in the form of a screw along the outer circumferential surface of the shaft, and ejecting the obtained polymerizable composition from the ejection portion.

[c6] The manufacturing method described in [c5], in which a rotation frequency of the shaft is within a range of 1,000 rpm to 4,000 rpm, and a rate at which the polymerizable composition is ejected from the ejection portion is within a range of 0.5 g/s to 4.0 g/s.

[c7] The manufacturing method described in [c5] or [c6], in which the viscosity of the polymerizable composition obtained by the step (ii) is equal to or less than 500 mPa·s at 20° C.

[c8] The manufacturing method described in any one of [c1] to [c7], in which the aromatic isocyanate contained in the isocyanate (A) is 2,4-tolylene diisocyanate or a mixture of 2,4-tolylene diisocyanate and 2,6-tolylene diisocyanate.

[c9] The manufacturing method described in any one of [c1] to [c8], in which the alcohol (B) contains at least one kind of compound selected from among glycerol, diglycerol, trimethylolpropane, pentaerythritol, di(trimethylolpropane), an ethylene oxide adduct of glycerol, an ethylene oxide adduct of trimethylolpropane, an ethylene oxide adduct of pentaerythritol, a propylene oxide adduct of glycerol, a propylene oxide adduct of trimethylolpropane, and a propylene oxide adduct of pentaerythritol.

[c10] The manufacturing method described in any one of [c1] to [c9], in which the alcohol (B) contains at least one kind of compound selected from among a propylene oxide adduct of glycerol, a propylene oxide adduct of trimethylolpropane, and a propylene oxide adduct of pentaerythritol.

[c11] The manufacturing method described in any one of [c1] to [c10], in which the acidic phosphoric acid ester (C) is contained in an amount of 0.1 parts by weight to 3.0 parts by weight with respect to a total of 100 parts by weight of the isocyanate (A) and the alcohol (B).

[c12] The manufacturing method described in any one of [c1] to [c11], in which the acidic phosphoric acid ester (C) is an acidic phosphoric acid ester represented by Formula (1),

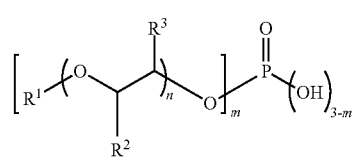

wherein, in the formula, m represents an integer of 1 or 2, n represents an integer of 0 to 18, $R^1$ represents an alkyl group having 1 to 20 carbon atoms, and each of $R^2$ and $R^3$ independently represents a hydrogen atom, a methyl group, or an ethyl group.

[c13] The manufacturing method described in any one of [c1] to [c12], in which the hindered amine-based compound (D) is contained in an amount of 0.1 parts by weight to 2.0 parts by weight with respect to a total of 100 parts by weight of the isocyanate (A) and the alcohol (B).

[c14] A polyurethane resin obtained by the manufacturing method described in any one of [c1] to [c13].

[c15] A manufacturing method of a polyurethane-molded product, in which in the manufacturing method of polyurethane resin described in any one of [c1] to [c13], the step (iii) includes a step of injecting the polymerizable composition into a mold, and a step of polymerizing the prepolymer and the alcohol (B) contained in the polymerizable composition in the mold.

[c16] A polyurethane-molded product obtained by the manufacturing method described in [c15].

[c17] An optical material comprised of the polyurethane-molded product described in [c16].

[c18] A plastic lens comprised of the optical material described in [c17].

[c19] A manufacturing method of a plastic polarizing lens, in which the manufacturing method of polyurethane resin described in any one of [c1] to [c13] includes a step of fixing a polarizing film in a casting mold for lens casting in a state in which at least one surface of the polarizing film is separated from the mold before the step (iii), and the step (iii) includes a step of injecting the polymerizable composition obtained by the step (ii) into a space between the polarizing film and the mold, and a step of polymerizing and curing the polymerizable composition and laminating a layer comprised of polyurethane resin over at least one surface of the polarizing film.

[c20] A plastic polarizing lens obtained by the manufacturing method described in [c19].

The invention claimed is:

1. A polymerizable composition for an optical material, comprising:
(A) at least one kind of isocyanate having two or more isocyanato groups, which contains aromatic isocyanate;
(B) at least one kind of alcohol having two or more hydroxyl groups;
(C) an acidic phosphoric acid ester represented by the following Formula (1); and
(D) a benzotriazole-based compound,
wherein a ratio of secondary hydroxyl groups to the total molar number of primary and secondary hydroxyl groups contained in the alcohol (B) is equal to or greater than 50%, and the benzotriazole-based compound (D) is contained in an amount of 1 part by weight to 11 parts by weight with respect to a total of 100 parts by weight of the isocyanate (A) and the alcohol (B),

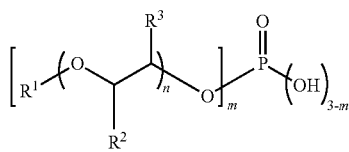
(1)

wherein, in the formula, m represents an integer of 1 or 2, n represents an integer of 0 to 18, $R^1$ represents an alkyl group having 1 to 20 carbon atoms, and each of $R^2$ and $R^3$ independently represents a hydrogen atom, a methyl group, or an ethyl group.

2. The polymerizable composition for an optical material according to claim 1,
wherein the alcohol (B) contains at least one kind of compounds selected from among glycerol, diglycerol, trimethylolpropane, pentaerythritol, di(trimethylolpropane), an ethylene oxide adduct of glycerol, an ethylene oxide adduct of trimethylolpropane, an ethylene oxide adduct of pentaerythritol, a propylene oxide adduct of glycerol, a propylene oxide adduct of trimethylolpropane, and a propylene oxide adduct of pentaerythritol.

3. The polymerizable composition for an optical material according to claim 1,
wherein the alcohol (B) contains at least one kind of compounds selected from among a propylene oxide adduct of glycerol, a propylene oxide adduct of trimethylolpropane, and a propylene oxide adduct of pentaerythritol.

4. The polymerizable composition for an optical material according to claim 1,
wherein the aromatic isocyanate is 2,4-tolylene diisocyanate or a mixture of 2,4-tolylene diisocyanate and 2,6-tolylene diisocyanate.

5. The polymerizable composition for an optical material according to claim 1,
wherein a molar ratio of the isocyanato groups of the isocyanate (A) to the hydroxyl groups of the alcohol (B) is 0.8 to 1.2.

6. The polymerizable composition for an optical material according to claim 1,
wherein the acidic phosphoric acid ester (C) is contained in an amount of 0.1 parts by weight to 3 parts by weight with respect to the total of 100 parts by weight of the isocyanate (A) and the alcohol (B).

7. The polymerizable composition for an optical material according to claim 1, further comprising a hindered amine-based compound,
wherein the hindered amine-based compound is contained in an amount of 0.1 parts by weight to 2 parts by weight with respect to the total of 100 parts by weight of the isocyanate (A) and the alcohol (B).

8. The polymerizable composition for an optical material according to claim 1,
wherein the benzotriazole-based compound (D) is contained in an amount of 2.1 parts by weight to 10 parts by weight with respect to the total of 100 parts by mass of the isocyanate (A) and the alcohol (B).

9. The polymerizable composition for an optical material according to claim 1, further comprising (E) a phenol-based compound;
wherein the phenol-based compound (E) is contained in an amount of 0.5 parts by weight to 5 parts by weight with respect to the total of 100 parts by weight of the isocyanate (A) and the alcohol (B).

10. A manufacturing method of a polyurethane-molded product, comprising:
a step of obtaining the polymerizable composition for an optical material according to claim 1 by mixing the alcohol (B), the acidic phosphoric acid ester (C), and the benzotriazole-based compound (D) together and then mixing the resultant with at least one kind of the isocyanate (A), which contains aromatic isocyanate and has two or more isocyanato groups, at a temperature of equal to or less than 30° C.;
a step of casting the polymerizable composition into a casting mold; and
a step of polymerizing the polymerizable composition by starting the polymerization of the composition at a temperature of equal to or less than 30° C.

11. The manufacturing method of a polyurethane-molded product according to claim 10,
wherein the step of obtaining the polymerizable composition for an optical material includes a step of obtaining the polymerizable composition for an optical material according to claim 9 by mixing the alcohol (B), the acidic phosphoric acid ester (C), the benzotriazole-based compound (D), and the phenol-based compound (E) together and then mixing the resultant with at least one kind of the isocyanate (A), which contains aromatic isocyanate and has two or more isocyanato groups, at a temperature of equal to or less than 30° C.

12. A manufacturing method of a plastic polarizing lens, comprising:
a step of obtaining the polymerizable composition for an optical material according to claim 1 by mixing the alcohol (B), the acidic phosphoric acid ester (C), and the benzotriazole-based compound (D) together and then mixing the resultant with at least one kind of the isocyanate (A), which contains aromatic isocyanate and has two or more isocyanato groups, at a temperature of equal to or less than 30° C.;
a step of fixing a polarizing film in a casting mold for lens casting in a state in which at least one surface of the polarizing film is separated from the mold;
a step of injecting the polymerizable composition into a space between the polarizing film and the mold; and
a step of laminating a layer comprised of polyurethane resin over at least one surface of the polarizing film by polymerizing and curing the polymerizable composition by starting the polymerization of the composition at a temperature of equal to or less than 30° C.

13. The manufacturing method of a plastic polarizing lens according to claim 12,
wherein the step of obtaining the polymerizable composition for an optical material includes a step of obtaining the polymerizable composition for an optical material according to claim 9 by mixing the alcohol (B), the acidic phosphoric acid ester (C), the benzotriazole-based compound (D), and the phenol-based compound (E) together and then mixing the resultant with at least one kind of the isocyanate (A), which contains aromatic isocyanate and has two or more isocyanato groups, at a temperature of equal to or less than 30° C.

14. A manufacturing method of a polyurethane-molded product, comprising:
a step (i) of obtaining a prepolymer by adding the alcohol (B) to the isocyanate (A) such that a ratio of the hydroxyl groups to the isocyanato groups of the isocyanate (A) falls into a range of 10 mol % to 20 mol % and reacting the isocyanate (A) with the alcohol (B) in the presence of the acidic phosphoric acid ester (C), the benzotriazole-based compound (D), and the hindered amine-based compound,
a step (ii) of obtaining the polymerizable composition for an optical material described in claim 1 by further adding the alcohol (B) to the prepolymer and mixing the alcohol (B) and the prepolymer together at a temperature of equal to or less than 30° C.; and
a step (iii) of polymerizing the prepolymer and the alcohol (B) contained in the polymerizable composition.

15. The manufacturing method according to claim 14,
wherein the step (i) includes a step of obtaining a prepolymer by adding the alcohol (B) to the isocyanate (A) such that the ratio of the hydroxyl groups to the isocyanato groups of the isocyanate (A) falls into a range of 10 mol % to 20 mol % and reacting the isocyanate (A) with the alcohol (B) in the presence of the acidic phosphoric acid ester (C), the benzotriazole-based compound (D), the phenol-based compound (E), and the hindered amine-based compound.

16. The manufacturing method according to claim 14,
wherein in the step (i), the reaction temperature is equal to or less than 30° C.

17. The manufacturing method according to claim 14,
wherein in the step (iii), heating is started at a temperature of equal to or less than 30° C. when the prepolymer and the alcohol (B) are polymerized.

18. The manufacturing method according to claim 14,
wherein the viscosity of the prepolymer and the polymerizable composition is equal to or less than 1,000 Pas at 20° C.

19. The manufacturing method according to claim 14,
wherein the step (ii) is performed by a mixing apparatus comprising a cylindrical container, a shaft that has been inserted into the container from the upper portion of the container along the central axis direction of the container, a stirring blade that is wound in the form of a screw along the outer circumferential surface of the shaft, a first supply portion that is disposed in the upper portion of the container and supplies a solution of the prepolymer into the container, a second supply portion that is disposed in the upper portion of the container and supplies a solution of the alcohol (B) into the container, and an ejection portion that is disposed at the bottom of the container,
wherein and the step (ii) includes
a step of supplying the prepolymer and the alcohol (B) into the container from the first supply portion and the second supply portion respectively and
a step of preparing the polymerizable composition by rotating the shaft such that the prepolymer and the alcohol (B) are moved down while being mixed together at a temperature of equal to or less than 30° C. by the stirring blade, which is wound in the form of a screw along the outer circumferential surface of the shaft, and ejecting the obtained polymerizable composition from the ejection portion.

20. The manufacturing method according to claim 19,
wherein a rotation frequency of the shaft is within a range of 1,000 rpm to 4,000 rpm, and a rate at which the polymerizable composition is ejected from the ejection portion is within a range of 0.5 g/s to 4.0 g/s.

21. The manufacturing method according to claim 19,
wherein in the step (ii), the viscosity of the obtained polymerizable composition is equal to or less than 500 mPa·s at 20° C.

22. The manufacturing method according to claim 19,
wherein the step (iii) includes
a step of injecting the polymerizable composition into a mold, and
a step of polymerizing the prepolymer and the alcohol (B) contained in the polymerizable composition in the mold.

23. A manufacturing method of a plastic polarizing lens, comprising:
a step of fixing a polarizing film in a casting mold for lens casting in a state in which at least one surface of the polarizing film is separated from the mold, before the step (iii) in the manufacturing method of a polyurethane-molded product according to claim 14,
wherein the step (iii) includes
a step of injecting the polymerizable composition obtained in the step (ii) into a space between the polarizing film and the mold, and
a step of laminating a layer comprised of polyurethane resin over at least one surface of the polarizing film by polymerizing and curing the polymerizable composition.

24. A polyurethane-molded product obtained by the manufacturing method according to claim 10.

25. An optical material comprised of the polyurethane-molded product according to claim 24.

26. A plastic lens comprised of the optical material according to claim 25.

27. A plastic polarizing lens obtained by the manufacturing method according to claim 12.

* * * * *